United States Patent
Maeda et al.

(10) Patent No.: US 8,660,046 B2
(45) Date of Patent: Feb. 25, 2014

(54) DATA COMMUNICATIONS METHOD AND MOBILE COMMUNICATIONS SYSTEM

(75) Inventors: Miho Maeda, Tokyo (JP); Mitsuru Mochizuki, Tokyo (JP); Yasushi Iwane, Tokyo (JP); Noriyuki Fukui, Tokyo (JP); Tetsuya Mishuku, Tokyo (JP); Michiaki Takano, Tokyo (JP); Ryoichi Fujie, Tokyo (JP); Shigenori Tani, Tokyo (JP); Akira Okubo, Tokyo (JP); Keisuke Ozaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1338 days.

(21) Appl. No.: 12/281,089

(22) PCT Filed: Aug. 9, 2006

(86) PCT No.: PCT/JP2006/315755
§ 371 (c)(1),
(2), (4) Date: Aug. 28, 2008

(87) PCT Pub. No.: WO2008/018130
PCT Pub. Date: Feb. 14, 2008

(65) Prior Publication Data
US 2010/0061285 A1    Mar. 11, 2010

(51) Int. Cl.
*H04H 1/00*    (2006.01)
*H04J 3/24*    (2006.01)

(52) U.S. Cl.
USPC .......................................................... 370/312

(58) Field of Classification Search
None
See application file for complete search history.

(56) References Cited

U.S. PATENT DOCUMENTS

| | | | | |
|---|---|---|---|---|
| 4,245,245 A | * | 1/1981 | Matsumoto et al. | 380/211 |
| 5,745,556 A | * | 4/1998 | Ronen | 379/127.05 |

(Continued)

FOREIGN PATENT DOCUMENTS

| | | |
|---|---|---|
| JP | 2002 77229 | 3/2002 |
| JP | 2005 124179 | 5/2005 |
| JP | 2005 518727 | 6/2005 |
| JP | 2005 528050 | 9/2005 |

(Continued)

OTHER PUBLICATIONS

"3rd Generation Partnership Project; Technical Specification Group Radio Access Network; Feasibility study for evolved Universal Terrestrial Radio Access (UTRA) and Universal Terrestrial Radio Access Network (UTRAN)", Release 7, 3GPP TR 25.912, V7.1.0, pp. 2-57, (2006).

(Continued)

*Primary Examiner* — Hassan Phillips
*Assistant Examiner* — Prenell Jones
(74) *Attorney, Agent, or Firm* — Oblon, Spivak, McClelland, Maier & Neustadt, L.L.P.

(57) ABSTRACT

In a communications system including a base station capable of altering a frequency bandwidth which is used for transmitting broadcast data for providing point-to-multipoint broadcasting communications service and which is used for transmitting individual communications data for providing point-to-point individual communications service, and a mobile terminal capable of altering a receivable bandwidth which is used for receiving at least the broadcast data and the individual communications data transmitted from the base station, decision processing of making a decision as to whether the mobile terminal can receive reception-desired content it desires to receive among contents provided by the broadcasting communications service is executed in accordance with a frequency occupying bandwidth used for transmitting the reception-desired content. Thus, the mobile terminal becomes able to make a decision as to whether it can receive particular E-MBMS content considering its own UE position.

15 Claims, 21 Drawing Sheets

(56) References Cited

U.S. PATENT DOCUMENTS

| | | | | |
|---|---|---|---|---|
| 5,864,610 | A * | 1/1999 | Ronen | 379/121.01 |
| 6,006,091 | A * | 12/1999 | Lupien | 455/435.1 |
| 6,195,677 | B1 * | 2/2001 | Utsumi | 709/201 |
| 6,633,765 | B1 * | 10/2003 | Maggenti | 455/503 |
| 7,260,079 | B1 * | 8/2007 | Chapman et al. | 370/338 |
| 7,437,278 | B2 * | 10/2008 | Suzuki | 703/2 |
| 7,623,869 | B2 * | 11/2009 | Lee et al. | 455/452.2 |
| 2002/0009059 | A1 * | 1/2002 | Abutaleb et al. | 370/318 |
| 2003/0223394 | A1 | 12/2003 | Parantainen et al. | |
| 2004/0001087 | A1 * | 1/2004 | Warmus et al. | 345/745 |
| 2004/0125761 | A1 * | 7/2004 | Yamaguchi et al. | 370/312 |
| 2004/0152466 | A1 | 8/2004 | Sinnarajah et al. | |
| 2004/0233861 | A1 * | 11/2004 | Kawai et al. | 370/312 |
| 2005/0022237 | A1 | 1/2005 | Nomura | |
| 2005/0070277 | A1 | 3/2005 | Hu | |
| 2005/0090278 | A1 | 4/2005 | Jeong et al. | |
| 2005/0129018 | A1 * | 6/2005 | Casaccia et al. | 370/390 |
| 2005/0192021 | A1 * | 9/2005 | Lee et al. | 455/452.2 |
| 2005/0249188 | A1 | 11/2005 | Hayashi | |
| 2006/0035661 | A1 * | 2/2006 | Niwano et al. | 455/522 |
| 2007/0250781 | A1 * | 10/2007 | Dolph | 715/745 |
| 2008/0318586 | A1 * | 12/2008 | Niwano et al. | 455/452 |
| 2009/0124196 | A1 * | 5/2009 | Moon et al. | 455/3.06 |
| 2009/0274112 | A1 * | 11/2009 | Ma et al. | 370/330 |

FOREIGN PATENT DOCUMENTS

| | | |
|---|---|---|
| JP | 2005 348392 | 12/2005 |
| JP | 2006 516870 | 7/2006 |
| KR | 10-2005-0072454 | 7/2005 |

OTHER PUBLICATIONS

"Discussion on LTE multicast & broadcast", LG Electronics, TSG-RAN Working Group 2 #53, R2-061319, Agenda Item: 11.8, pp. 1-5, (2006).

"Discussion on the paging", Panasonic, 3GPP TSG RAN WG1 AH, R1-061772, Agenda Item: 4.4, pp. 1-3, (2006).

"Physical Allocation of PCH for 20MHz Operating Bandwidth", Sharp, 3GPP TSG-RAN WG1 LTE Ad-Hoc, R1-061683, Agenda Item: 4.4, pp. 1/6-6/6, (2006).

U.S. Appl. No. 13/499,737, filed Apr. 2, 2012, Mochizuki, et al.

U.S. Appl. No. 13/264,767, filed Oct. 17, 2011, Mochizuki, et al.

Extended European Search Report issued Aug. 9, 2012 in Patent Application No. 06782571.1.

Panasonic, "Unicast/multicast Multiplexing for Downlink OFDM", 3GPP Draft; R1-060158, $3^{rd}$ Generation Partnership Project (3GPP), vol. RAN WG1, No. Helsinki, Finland, XP-050111293, Jan. 19, 2006, 4 pages.

Huawei, "UE Capability Selection Considering MBMS Transmission", 3GPP Draft; R1-060230, $3^{rd}$ Generation Partnership Project (3GPP), vol. RAN WG1, No. Helsinki, Finland, XP-050111361, Jan. 19, 2006, 2 pages.

"Principles of Scalable Bandwidth Scenarios", 3GPP Draft; R2-0601001, $3^{rd}$ Generation Partnership Project (3GPP), vol. RAN WG2, No. Athens, Greece, XP-050130981, Mar. 23, 2006, 6 pages.

Qualcomm Europe S A R L, "E-MBMS Architecture and Principles", 3GPP Draft; R2-060978, $3^{rd}$ Generation Partnership Project (3GPP), vol. RAN WG2, No. Athens, Greece, XP-050130907, Mar. 23, 2006, pp. 1-13.

Huawei, "Further Consideration on Multiplexing of Unicast and MBMS", 3GPP Draft; R1-060235, $3^{rd}$ Generation Partnership Project (3GPP), vol. RAN WG1, No. Helsinki, Finland, XP-050111366, Jan. 19, 2006, 4 pages.

"$3^{rd}$ Generation Partnership Project; Technical Specification Group Radio Access Network; UE Radio Access Capabilities (Release 7)", 3GPP Standard; 3GPP TS 25.306, $3^{rd}$ Generation Partnership Project (3GPP), No. V7.0.0, XP-050367493, Mar. 1, 2006, pp. 1-36.

\* cited by examiner

| Content Number | Content Title | | Frequency Occupying Bandwidth | Presence or Absence of Unicast | E-MBMS Service Position |
|---|---|---|---|---|---|
| CH1 | Weather Forecast | ... | 5MHz | Absent | Positions 1 and 2 |
| CH2 | Baseball Broadcast | ... | 10MHz | Absent | Position 1 |
| CH3 | Movie Broadcast | ... | 20MHz | Absent | — |
| CH4 | Mail Order | ... | 5MHz | Present | Position 1 |
| ⋮ | ⋮ | ⋮ | ⋮ | ⋮ | ⋮ |

| Category | ... | Receivable Bandwidth | Possibility of Simultaneous Reception of E-MBMS and Unicast |
|---|---|---|---|
| Category 1 | ... | 20MHz | Possible |
| Category 2 | ... | 20MHz | Impossible |
| Category 3 | ... | 10MHz | Possible |
| Category 4 | ... | 10MHz | Impossible |
| ⋮ | ⋮ | ⋮ | ⋮ |

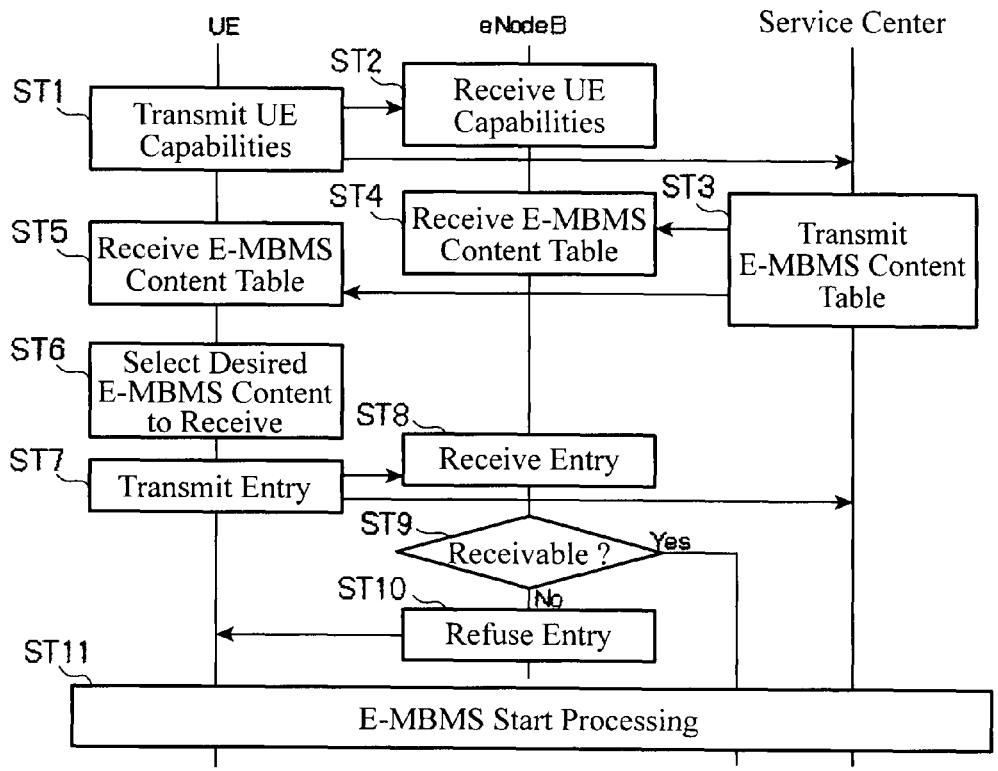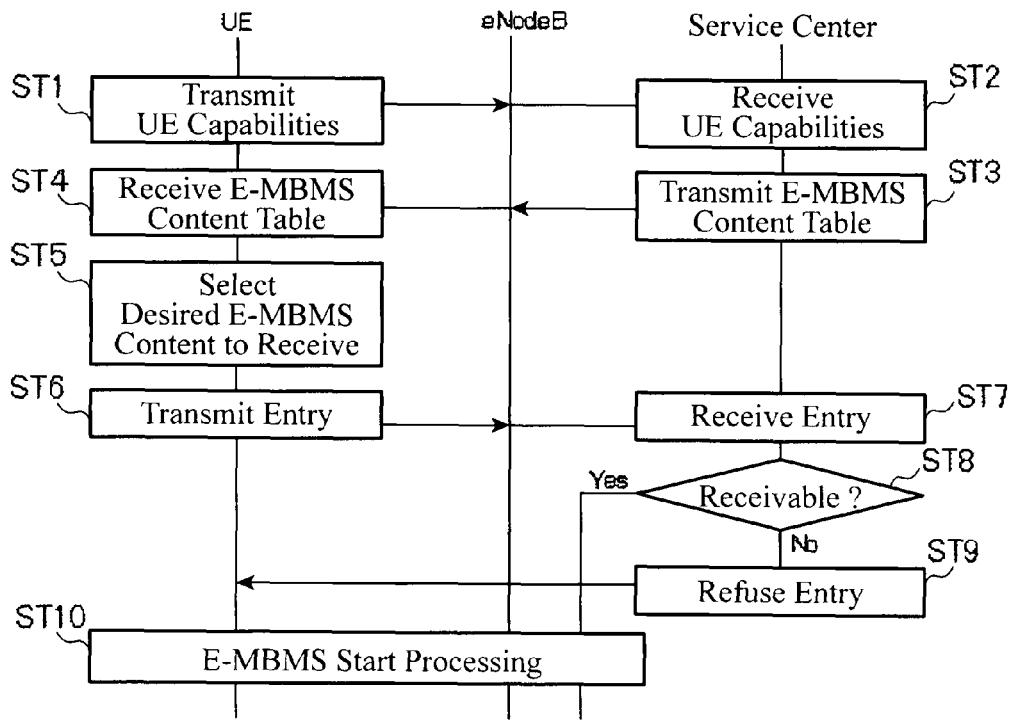

DATA COMMUNICATIONS METHOD AND MOBILE COMMUNICATIONS SYSTEM

TECHNICAL FIELD

The present invention relates to a mobile communications system in which a base station performs radio communications with a plurality of mobile terminals, and particularly to a data communications method and a mobile communications system for providing multimedia multicast/broadcast service to the mobile terminals.

BACKGROUND ART

Among the so-called third generation communications schemes, commercial service of a W-CDMA (Wideband Code division Multiple Access) scheme has started from 2001 in Japan. In addition, HSDPA (High Speed Downlink Packet Access) service is scheduled to start which implements higher speed data transmission using a downlink by adding a channel (HS-DSCH: High Speed-Downlink Shared Channel) for packet transmission to the downlink (individual data channel and individual control channel). Furthermore, to further speed up uplink data transmission, an HSUPA (High Speed Uplink Packet Access) scheme has been proposed and investigated. The W-CDMA is a communications scheme determined by 3GPP (3rd Generation Partnership Project), a standardization organization of mobile communications systems, and specifications of a sixth release version have been arranged at present.

In addition, as communications schemes other than the W-CDMA, 3GPP investigates new communications schemes referred to as "Long Term Evolution" (LTE) for radio sections and "System Architecture Evolution" (SAE) for the total system configuration including a core network. In LTE, an access scheme, radio channel configuration and protocol differ from those of the current W-CDMA (HSDPA/HSUPA). For example, as for the access scheme, although W-CDMA employs CDMA (Code Division Multiple Access), LTE uses OFDM (Orthogonal Frequency Division Multiplexing) in the downlink, and SC-FDMA (Single Carrier Frequency Division Multiple Access) in the uplink direction. In addition, as for a bandwidth, although W-CDMA is 5 MHz, LTE can use 1.25/2.5/5/10/15/20 MHz. Besides, LTE does not employ circuit switching as W-CDMA does, but uses only a packet communications scheme.

Since LTE employs a new core network different from the core network (GPRS) of W-CDMA to construct a communications system, it is defined as a radio access network independent of a W-CDMA network. Accordingly, to distinguish from the W-CDMA communications system, in the LTE communications system, abase station for performing communications with a mobile terminal UE (User Equipment) is called eNB (E-UTRAN NodeB), and a base station controller (Radio Network Controller) for transferring control data and user data between it and a plurality of base stations is called aGW (Access Gateway). The multimedia multicast/broadcast service carried out by the LTE communications system is referred to as E-MBMS (Evolved Multimedia Broadcast Multicast Service), and transmits masses of broadcasting contents such as news, weather forecasts and mobile broadcasting to a plurality of mobile terminals. It is also referred to as point to multipoint service. A base station transmits E-MBMS data to mobile terminals by mapping the E-MBMS data on a DL-SCH (Downlink Shared Channel) or on an MCH (Multicast Channel). In addition, LTE provides not only broadcast communications service, but also communications service to each mobile terminal of the plurality of mobile terminals. The communications service for the individual mobile terminals is referred to as Unicast service. Since LTE differs from W-CDMA in that it does not have individual channels (Dedicated Channel and Dedicated Physical Channel) for the individual mobile terminals in the transport channel and physical channel, the data transmission to the individual mobile terminals is carried out through a shared channel.

Patent Document 1 discloses a method by which a mobile terminal that is receiving broadcast service processes point to point communications such as telephone speech conversation in a cdma 2000 communications system. In addition, Non-Patent Document 1 prescribes in an LTE system that the minimum capability of the receivable bandwidth of a mobile terminal is 10 MHz, and the bandwidth of a base station is variable up to the maximum of 20 MHz (that is, 1.25/2.5/5/10/20 MHz). Furthermore, Non-Patent Document 2 discloses a processing procedure of the eNodeB performed according to information transmitted from a mobile terminal to indicate the necessity of receiving E-MBMS service. However, Non-Patent Document 2 does not disclose a detailed procedure for receiving both the E-MBMS service and Unicast service simultaneously.

Besides, Non-Patent Document 3 discloses a technique of transmitting a paging message and broadcast information for achieving low power consumption of a mobile terminal. However, it does not disclose a problem proper to the LTE in that the receivable bandwidth of the mobile terminal becomes narrower than the bandwidth the base station uses. In addition, it does not disclose the relationship between the position on the frequency axis and a paging message. Non-Patent Document 4 discloses a transmission method of a PCH focusing on the UE position on the frequency axis. In addition, it discloses a technique of transmitting a paging indicator to the position side of the mobile terminal. However, it does not disclose any problems arising when the mobile terminal that is receiving E-MBMS service receives information used for incoming call processing (such as paging message and paging indicator), and the solving method thereof.

Patent Document 1: WO2004/71125.
Non-Patent Document 1: 3GPP TR25.912 V7.1.0.
Non-Patent Document 2: 3GPP R2-61319.
Non-Patent Document 3: 3GPP R1-61772.
Non-Patent Document 4: 3GPP R1-61683

DISCLOSURE OF THE INVENTION

Problems to be Solved by the Present Invention

In the conventional technique (UTRAN system), however, the bandwidth is determined at 5 MHz uniformly for both the mobile terminal and base station. In contrast with this, in the LTE system, the receivable bandwidth of the mobile terminal is set at 10 MHz at minimum, and the bandwidth of the base station is set at 20 MHz at maximum. In other words, it is not always necessary for the mobile terminal to have the receivable bandwidth of 20 MHz. Thus, the mobile terminal with the receivable bandwidth of 10 MHz cannot receive content of the E-MBMS service transmitted from the base station using a frequency band of 20 MHz.

Furthermore, specifications of the LTE mobile terminal are decided on a plan to make use of both the E-MBMS service and individual data communications (Unicast) service. However, if the mobile terminal does not have enough processing capability of hardware and software, it sometimes cannot receive the E-MBMS data and Unicast data simultaneously.

Beside, to receive the Unicast data, the mobile terminal must receive the information (paging message, paging indicator and the like) used for the incoming call processing (paging). However, a method of receiving the information used for the incoming call processing during E-MBMS reception is not specified.

Means for Solving the Problems

The present invention is provided to solve the foregoing problems, and in a data communications method executed in a communications system including a base station capable of altering a frequency bandwidth which is used for transmitting broadcast data for providing point-to-multipoint broadcasting communications service and which is used for transmitting individual communications data for providing point-to-point individual communications service, and a mobile terminal capable of altering a receivable bandwidth which is used for receiving at least the broadcast data and the individual communications data transmitted from the base station, decision processing of making a decision as to whether the mobile terminal can receive reception-desired content it desires to receive among contents provided by the broadcasting communications service is executed in accordance with a frequency occupying bandwidth used for transmitting the reception-desired content.

According to the present invention, in a mobile communications system including a base station capable of altering a frequency bandwidth which is used for transmitting broadcast data for providing point-to-multipoint broadcasting communications service and which is used for transmitting individual communications data for providing point-to-point individual communications service, and a mobile terminal capable of altering a receivable bandwidth which is used for receiving at least the broadcast data and the individual communications data transmitted from the base station, the mobile terminal makes a decision as to whether the mobile terminal can receive reception-desired content it desires to receive among contents provided by the broadcasting communications service in accordance with a frequency occupying bandwidth used for transmitting the reception-desired content.

Advantages of the Present Invention

According to the present invention, in the data communications method performed in the communications system including a base station capable of altering a frequency bandwidth which is used for transmitting broadcast data for providing point-to-multipoint broadcasting communications service and which is used for transmitting individual communications data for providing point-to-point individual communications service, and a mobile terminal capable of altering a receivable bandwidth which is used for receiving at least the broadcast data and the individual communications data transmitted from the base station, the decision processing of making a decision as to whether the mobile terminal can receive reception-desired content it desires to receive among contents provided by the broadcasting communications service is executed in accordance with a frequency occupying bandwidth used for transmitting the reception-desired content. Thus, the mobile terminal becomes able to make a decision as to whether it can receive particular E-MBMS content considering its own UE position.

According to the present invention, in the mobile communications system including a base station capable of altering a frequency bandwidth which is used for transmitting broadcast data for providing point-to-multipoint broadcasting communications service and which is used for transmitting individual communications data for providing point-to-point individual communications service, and a mobile terminal capable of altering a receivable bandwidth which is used for receiving at least the broadcast data and the individual communications data transmitted from the base station, the mobile terminal makes a decision as to whether the mobile terminal can receive reception-desired content it desires to receive among contents provided by the broadcasting communications service in accordance with a frequency occupying bandwidth used for transmitting the reception-desired content. Thus, the mobile terminal becomes able to make a decision as to whether it can receive particular E-MBMS content considering its own UE position.

BRIEF DESCRIPTION OF THE DRAWINGS

FIG. 11 is a flowchart for explaining the processing of the base station that makes a decision as to whether the mobile terminal can receive the E-MBMS service or not;

FIG. 12 is a flowchart for explaining the processing of a network that makes a decision as to whether the mobile terminal can receive the E-MBMS service or not;

EXPLANATION OF SYMBOLS 1 aGW, 2 base station, 3 mobile terminal, 4 packet data network,
5 service center, 6 protocol processing section,
7 application section, 8 transmission data buffer section,
9 encoder section, 10 modulating section,
11 frequency converting section, 12 antenna,
13 demodulating section, 14 decoding section,
15 control section, 16 aGW communications section,
17 other base station communications section,
18 protocol processing section,
19 transmission data buffer section, 20 encoder section,
21 modulating section, 22 frequency converting section,
23 antenna, 24 demodulating section, 25 decoder section,
26 control section.

BEST MODE FOR CARRYING OUT THE INVENTION

Embodiment 1

Figure 1:
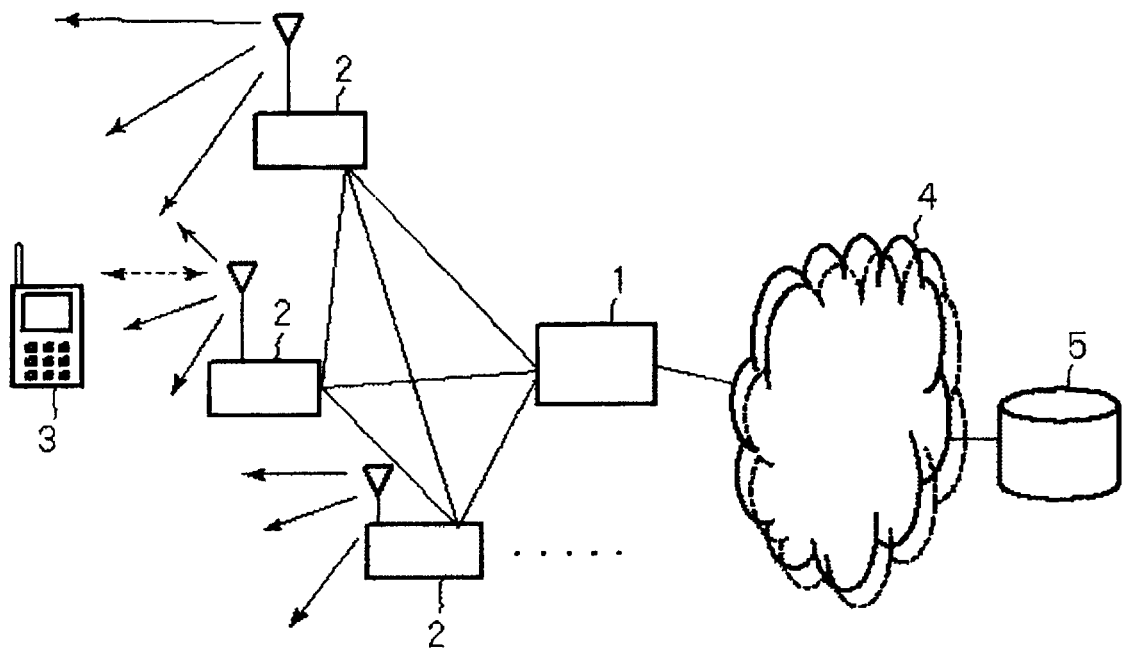
FIG. 1 is a diagram showing a configuration of a mobile communications system in LTE.

FIG. 1 is a diagram showing a configuration of a mobile communications system in LTE. In FIG. 1, an aGW 1 performs transmission and reception of control data and user data with a plurality of base stations (eNodeB) 2, and each base station 2 carries out transmission and reception of data with a plurality of mobile terminals 3. Between the base station 2 and mobile terminal 3, are transmitted broadcast control information, information used for the incoming call processing, individual control data, individual user data, and control data and user data for E-MBMS. In addition, communications between the base stations 3 have been investigated. The base station 2 has an uplink and downlink scheduler. The scheduler enables the transmission and reception of the data between the base station 2 and each mobile terminal 3, and arranges a schedule for improving throughput of the individual mobile terminal 3 and of the entire mobile communications system.

The E-MBMS provides broadcast point to multipoint (P to M) communications service that transmits data from the base station to a plurality of mobile terminals simultaneously. More specifically, information service such as news and a weather forecast and masses of broadcast service such as mobile TV have been investigated. In the E-MBMS transmission, two types of transmission, multi-cell transmission and single-cell transmission, have been investigated. The multi-cell transmission transmits the E-MBMS broadcast service from a plurality of base stations at the same frequency, thereby enabling the mobile terminal to combine the E-MBMS data from the plurality of base stations. The E-MBMS data is mapped onto an MCH and transmitted.

On the other hand, the single-cell transmission transmits the same E-MBMS broadcast service only within a single cell. In this case, the E-MBMS data is mapped onto a DL-SCH and transmitted. In the single-cell transmission, each base station can transmit the E-MBMS data at different frequencies. The aGW 1 performs communications with a service center 5 via a PDN (Packet Data Network) 4. The service center 5 is an apparatus for keeping and distributing contents for providing the E-MBMS service. A content provider transmits the E-MBMS data such as mobile TV broadcasting data to the service center 5. The service center 5 stores the E-MBMS data, and transmits the E-MBMS data to the base stations 2 via the PDN 4 and aGW 1.

Figure 2:
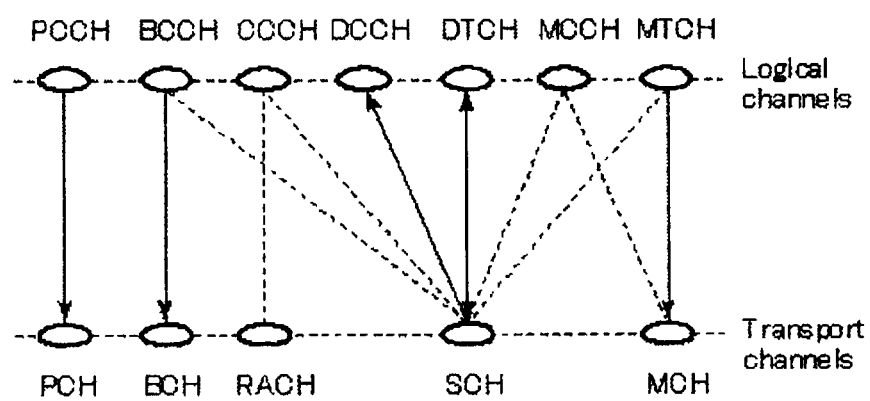
FIG. 2 is a diagram showing an arrangement of channels used in an LTE communications system.

FIG. 2 is a diagram showing a channel arrangement. FIG. 2 shows mapping between logical channels and transport channels. The logical channels are classified according to functions and logical characteristics of a transmission signal. The transport channels are classified according to a transmission mode. The broadcast control information is put on a BCCH (Broadcast Control Channel). The BCCH is mapped onto a BCH (Broadcast Channel), and is transmitted from the base station to the mobile terminal. The information used for the incoming call processing is put on a PCCH (Paging Control Channel). The PCCH is mapped onto a PCH (Paging Channel), and is transmitted from the base station to the mobile terminals within the cell. The individual control data addressed to the individual mobile terminals is put on a DCCH (Dedicated Control Channel).

In addition, the individual user data addressed to the individual mobile terminals are put on a DTCH (Dedicated Traffic Channel). The DCCH and DTCH are mapped onto a DL-SCH (Downlink Shared Channel), and transmitted from the base station to the individual mobile terminals separately. Conversely, using a UL-SCH (Uplink Shared Channel), the user data are transmitted from the individual mobile terminals to the base station separately. The DL-SCH is a shared channel. The control data and user data for the E-MBMS are put on an MCCH (Multicast Control Channel) and an MTCH (Multicast Traffic Channel), are mapped onto the DL-SCH or MCH (Multicast Channel), respectively, and are transmitted from the base station to the mobile terminals. A connection request signal from each mobile terminal is transmitted from the mobile terminal to the base station via a random access channel (RACH).

Figure 3:
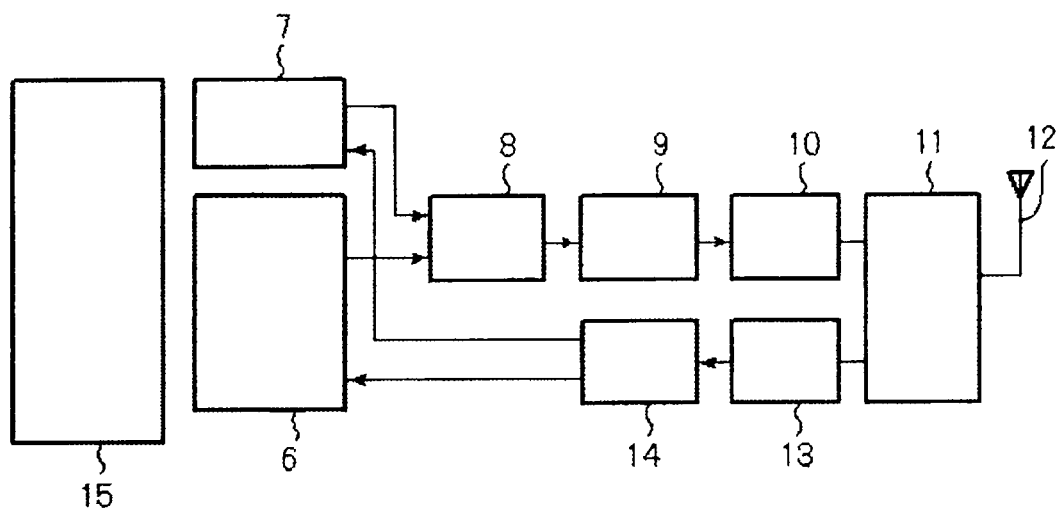
FIG. 3 is a block diagram showing a configuration of a mobile terminal.

FIG. 3 is a block diagram showing a configuration of the mobile terminal. The mobile terminal 3 carries out the transmission processing as follows. First, control data from a protocol processing section 6 and user data from an application section 7 are stored in a transmission data buffer section 8. The data stored in the transmission data buffer section 8 is delivered to an encoder section 9 to undergo encoding processing such as error correction. Such data that is supplied from the transmission data buffer section 8 to a modulating section 10 directly without undergoing the encoding processing can also be present. The data passing through the encoding processing in the encoder section 9 is subjected to modulating processing in the modulating section 10. The modulated data is converted to a baseband signal and then supplied to a frequency converting section 11 to be converted to a radio transmission frequency. After that, the transmission signal is sent from an antenna 12 to the base station 2. On the other hand, the receiving processing of the mobile terminal 3 is performed as follows. A radio signal from the base station 2 is received by the antenna 12. The received signal is converted from the radio receiving frequency to a baseband signal by the frequency converting section 11, and undergoes demodulating processing by a demodulating section 13. The data after the demodulation is delivered to a decoder section 14 which carries out decoding processing such as error correction. Among the decoded data, the control data is delivered to the protocol processing section 6, and the user data is delivered to the application section 7. A series of the transmission and reception processing of the mobile terminal is controlled by a control section 15.

Figure 4:
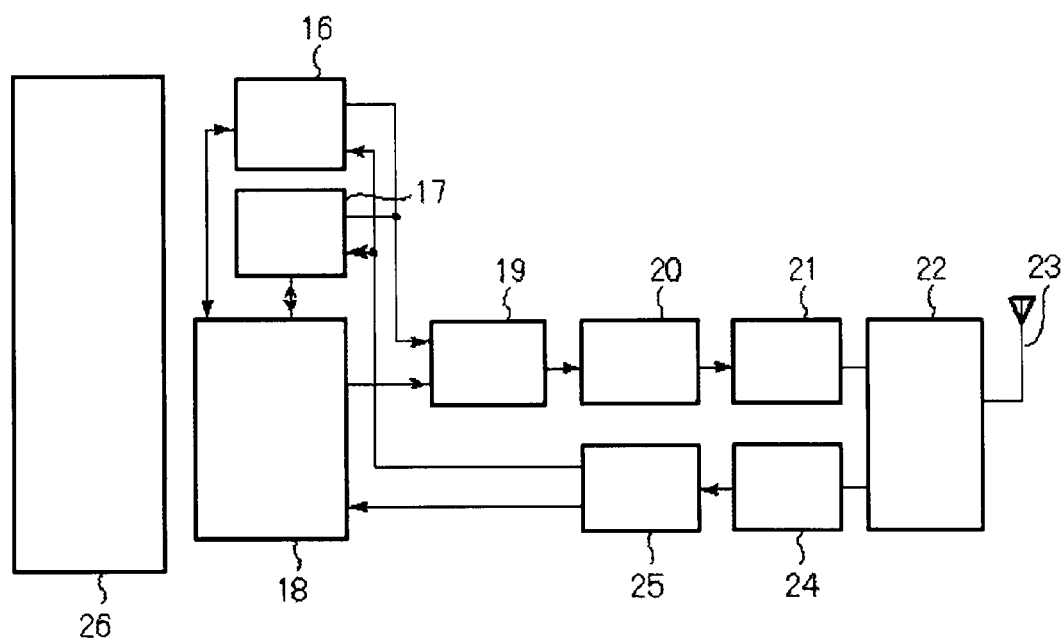
FIG. 4 is a block diagram showing a configuration of a base station.

FIG. 4 is a block diagram showing a configuration of the base station. The base station 2 performs the transmission processing as follows. An aGW communications section 16 carries out data transmission and reception between the base station 2 and the aGW 1. An other base station communications section 17 performs data transmission and reception with another base station. The aGW communications section 16 and the other base station communications section 17 each exchange information with a protocol processing section 18. The control data from the protocol processing section 18 and the user data from the aGW communications section 16 and other base station communications section 17 are stored in the transmission data buffer section 19. The data stored in the transmission data buffer section 19 are delivered to an encoder section 20 to undergo encoding processing such as error correction. Such data that is supplied from the transmission data buffer section 19 to a modulating section 21 directly without undergoing the encoding processing can also be present. The encoded data is subjected to modulating processing in the modulating section 21.

The modulated data is converted to a baseband signal, and then supplied to a frequency converting section 22 to be converted to a radio transmission frequency. After that, a transmission signal is transmitted from an antenna 23 to one or more mobile terminals 3. On the other hand, the base station 2 performs the receiving processing as follows. Radio signals from one or more mobile terminals 3 are received by the antenna 23. A received signal is converted from the radio receiving frequency to a baseband signal by the frequency converting section 22, and a demodulating section 24 performs demodulating processing. The demodulated data is delivered to a decoder section 25 to undergo decoding processing such as error correction. Among the decoded data, the control data is delivered to the protocol processing section 18, and the user data is delivered to the aGW communications section 16 and other base station communications section 17. A series of the transmission and reception processing of the base station 2 is controlled by a control section 26.

Figures 5, 6:
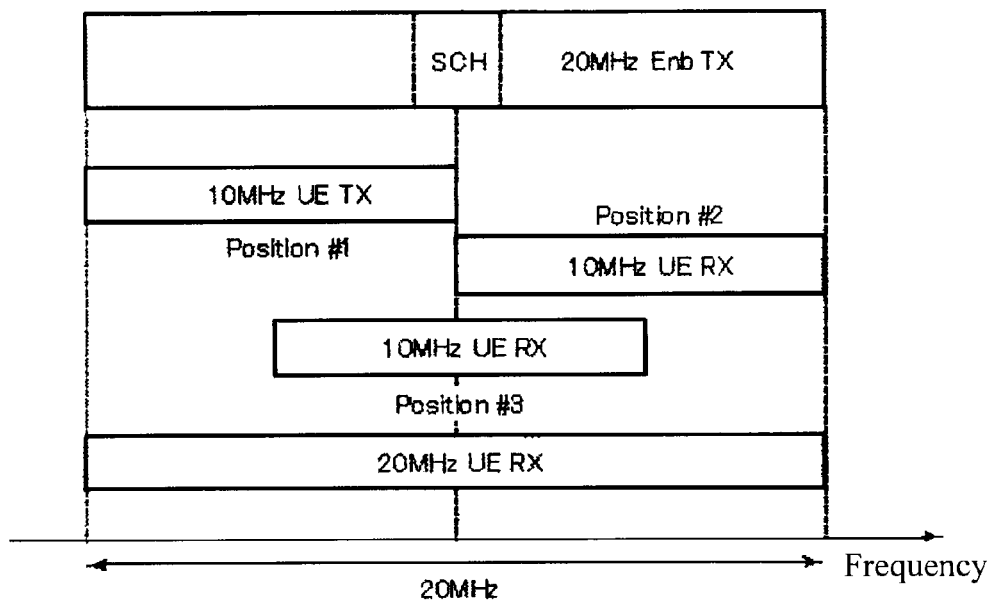
FIG. 5 is a diagram showing the relationship between the bandwidth of the base station and the receivable bandwidth of the mobile terminal.
FIG. 6 is a diagram showing an E-MBMS content table distributed to the mobile terminal.

FIG. 5 is a diagram showing the relationship between the bandwidth of the base station and the receivable bandwidth of the mobile terminal. In the LTE system, the bandwidth of the base station is specified by selecting from 1.25/2.5/5/10/15/20 MHz to be used. The receivable bandwidth of the mobile terminal is specified in such a manner as to support a maximum of 20 MHz, and at least 10 MHz. When the receivable bandwidth of the mobile terminal is less than the bandwidth of the base station, the mobile terminal negotiates with the base station, and shifts between positions, that is, carries out processing of changing the center frequency of the radio transmission and reception frequency. The processing is referred to as retuning. FIG. 5 shows an example in which the bandwidth of the base station is 20 MHz, and the receivable bandwidth of the mobile terminal is 10 MHz or 20 MHz. When the receivable bandwidth of the mobile terminal is 10 MHz, the mobile terminal cannot receive the full band at once of the bandwidth of the base station of 20 MHz. Thus, it performs communications using the frequency range of 10 MHz. In this case, the position of 10 MHz for performing communications is not necessarily one, but can take a plurality of positions such as positions #1, #2 and #3 in FIG. 5 depending on the manner of determining the center frequency. In contrast, when the receivable bandwidth of the mobile terminal is 20 MHz, since it equals the bandwidth of the base station, the mobile terminal can use the full transmission bandwidth of the base station. In this case, the foregoing retuning is not necessary.

Figure 7:
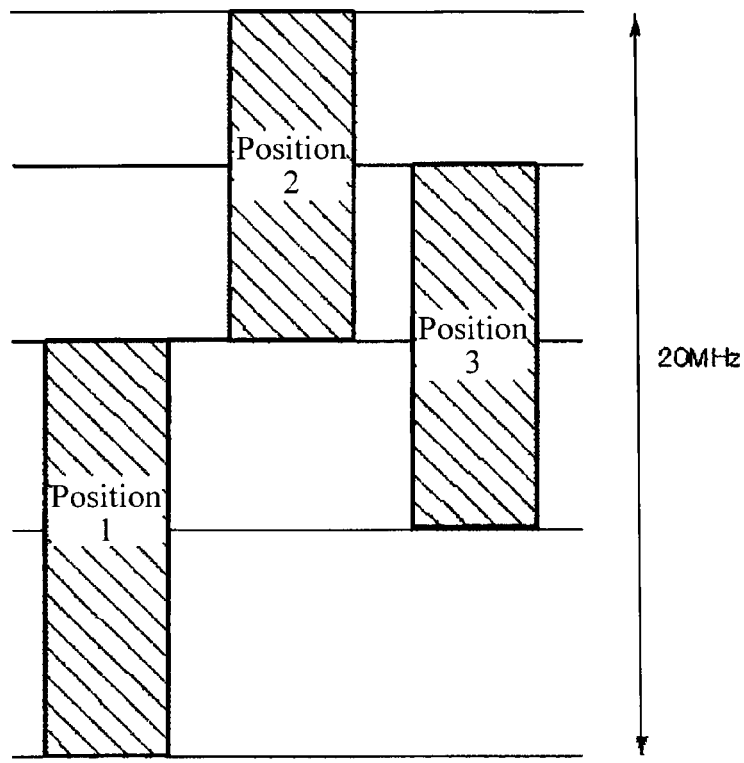
FIG. 7 is a diagram showing positions on a frequency axis assigned to E-MBMS service.

Next, the processing will be described of making a decision as to whether the mobile terminal can receive the E-MBMS service or not when the receivable bandwidth of the mobile terminal 3 is 10 MHz and the bandwidth of the base station 2 is 20 MHz. FIG. 6 is a diagram showing an E-MBMS content table distributed to the mobile terminal. FIG. 7 is a diagram showing positions on the frequency axis assigned to the E-MBMS service.

When the maximum bandwidth of the base station is 20 MHz and the receivable bandwidth of the mobile terminal is 10 MHz, the mobile terminal cannot receive some E-MBMS contents (programs) depending on a frequency occupying bandwidth they use. In the conventional W-CDMA technique, since the bandwidth of the base station and the receivable bandwidth of the mobile terminal are both 5 MHz, any solutions of such a problem are not considered, and the mobile terminal cannot make a decision as to whether particular E-MBMS content is receivable. Thus, considering the capability (receivable bandwidth) of the mobile terminal itself, the frequency occupying bandwidths used by the individual contents (that is, used for transmitting and receiving the contents) are added to the E-MBMS content table distributed from the base station to the mobile terminal as parameters with establishing correspondence between the frequency occupying bandwidths and the individual E-MBMS contents to enable the mobile terminal to make a decision as to whether it can receive the particular E-MBMS content. By adding the frequency occupying bandwidths used by the individual E-MBMS to the E-MBMS content table as the parameters in this way, the mobile terminal becomes able to decide on whether it can receive the particular E-MBMS content considering its own receivable bandwidth.

In addition, there are some cases where the E-MBMS content includes additional Unicast service addressed to a particular mobile terminal. For example, consider a situation where a user refers to detailed information about a product (bag) when using mail order E-MBMS content. In this case, the mobile terminal transmits uplink (mobile terminal→network side) Unicast data designating "bag" in response to user instructions. Receiving the Unicast data transmitted from the mobile terminal, the network side transmits detailed information about "bag" as downstream (network side→mobile terminal) Unicast information. At this time, the detailed information about "bag" is transmitted to the particular user who requests it. Thus, to receive the E-MBMS content having additional Unicast service, it is assumed that the mobile terminal can process the E-MBMS service and Unicast service simultaneously using its hardware or software processing capability. However, the conventional mobile terminal cannot decide as to whether the particular E-MBMS content has the Unicast service annexed to them.

In view of this, considering the capability of the mobile terminal itself (processing capability of the hardware and software, here), a parameter (individual communications presence or absence information) indicating whether the Unicast service is annexed or not is added to the E-MBMS content table distributed from the base station to the mobile terminal with establishing correspondence between the parameter and the E-MBMS content to enable the mobile terminal to decide as to whether it can receive the E-MBMS content to which the Unicast service is annexed. Thus adding the parameter indicating whether the Unicast service is annexed or not to the E-MBMS content table with establishing correspondence between the parameter and the E-MBMS content makes it possible for the mobile terminal to decide on whether it can receive the particular E-MBMS content with considering the processing capability of itself (whether it can receive the E-MBMS and Unicast data simultaneously).

When the bandwidth of the base station is 20 MHz at the maximum and the receivable bandwidth of the mobile terminal is 10 MHz, the receiving position (UE position) on the frequency axis of the mobile terminal is assumed to have three different receiving positions as shown in FIG. 7 depending on the method of determining the center frequency. Accordingly, the mobile terminal with the UE position of position 1, for example, has a problem of being unable to receive the E-MBMS content transmitted using the frequency band of the position 2 (E-MBMS service position). To solve such a problem, it is preferable that the mobile terminal be able to decide as to whether it can receive particular E-MBMS content or not considering the UE position and the E-MBMS service position. Thus, to enable the mobile terminal to decide as to whether it can receive the particular E-MBMS content, the E-MBMS content table distributed from the base station to the mobile terminal is designed in such a manner as to include the E-MBMS service position that is used by each content (that is, used for transmitting and receiving the content) as a parameter (content transmission frequency band information) with establishing correspondence between the E-MBMS content and the E-MBMS service position. Thus adding the E-MBMS service position to the E-MBMS content table as the parameter, the mobile terminal becomes able to make a decision as to whether it can receive the particular E-MBMS content considering its own UE position.

As described above, an example of the E-MBMS content table including the frequency occupying bandwidth, the presence or absence of the annexed Unicast service and the E-MBMS service position as the parameters is shown in FIG. 6. Here, it is not always necessary for the E-MBMS content table to include all the parameters. It can use a certain parameter alone or certain parameters in combination. In addition, as for the foregoing parameters, similar effects can also be achieved by notifying the mobile terminal of them in another way rather than adding them to the E-MBMS content table as parameters. Furthermore, although the foregoing description is made by way of example where the receivable bandwidth of the mobile terminal is 10 MHz, the idea disclosed in the foregoing description is applicable to the communications system in which the base station has a bandwidth different from that of the mobile terminal.

Figure 8:
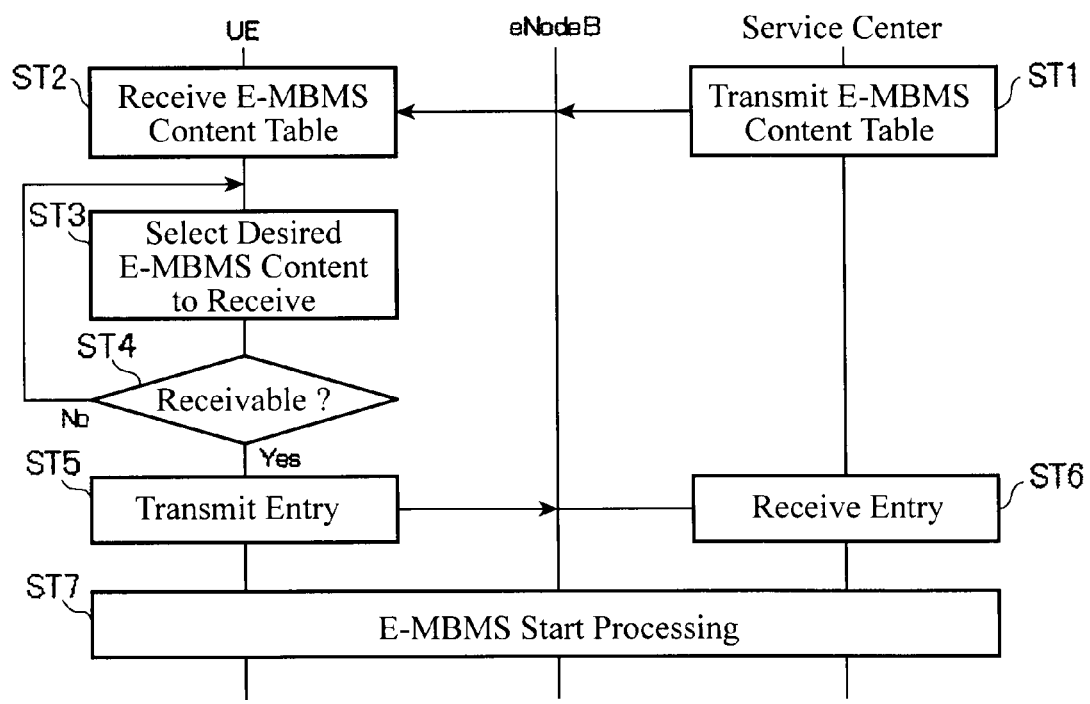
FIG. 8 is a flowchart for explaining processing of the mobile terminal that makes a decision as to whether the E-MBMS service is receivable or not.
Figures 9, 10:
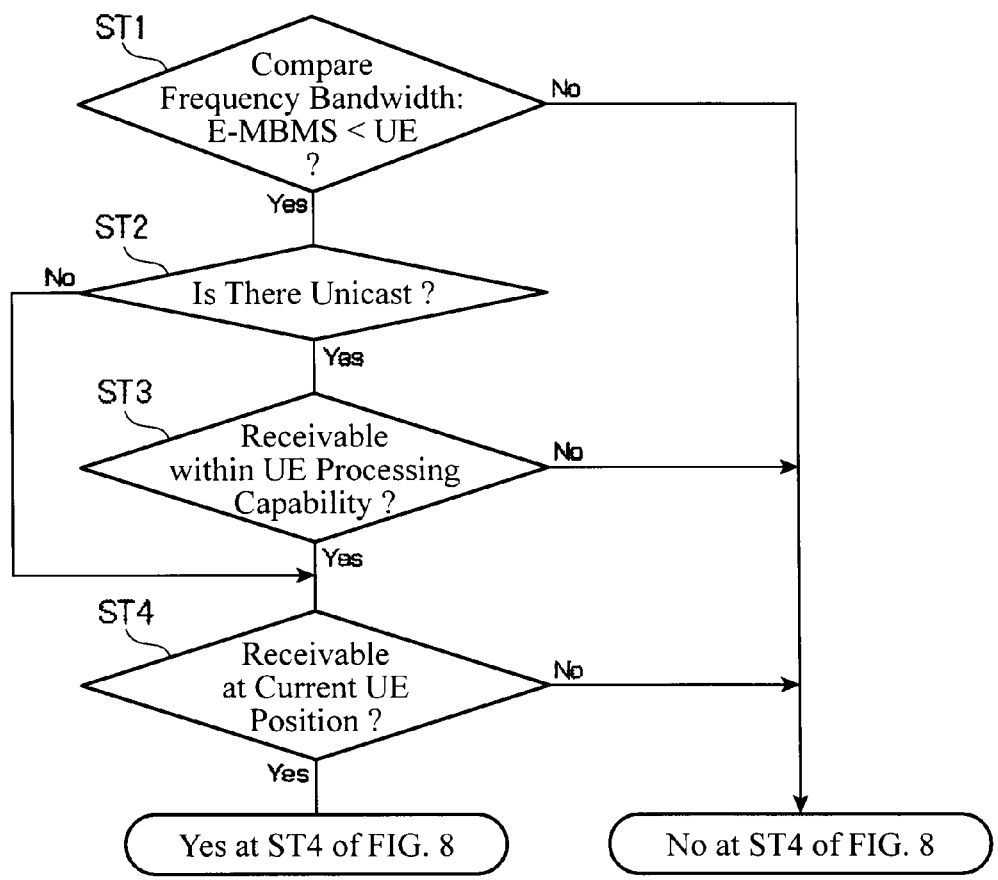
FIG. 9 is a flowchart for explaining the processing content shown in FIG. 8 in more detail.
FIG. 10 is a diagram showing UE capability information on the mobile terminal, to which a network side refers.

Next, concrete processing of the mobile terminal using the E-MBMS content table of FIG. 6 will be described. FIG. 8 is a flowchart for explaining the processing of the mobile terminal that makes a decision as to whether it can receive the E-MBMS service. FIG. 9 is a flowchart for explaining the processing content of FIG. 8 in more detail. At step 1 of FIG. 8, the network such as the service center 5 transmits the E-MBMS content table to the mobile terminal 3 via the base station 2 (eNodeB), and at step 2, the mobile terminal 3 receives the E-MBMS content table. The base station 2 as well as the mobile terminal 3 can receive the E-MBMS content table. The E-MBMS content table is assumed to include part or all of the three parameters consisting of the frequency occupying bandwidth, the presence or absence of the annexed Unicast service, and the E-MBMS service position. Alternatively, it is also possible to transmit the parameters independently of the E-MBMS content table rather than to transmit them in a state where they are included in the E-MBMS content table.

The E-MBMS content table can be notified using an MCH which is a transport channel or via a BCH or DL-SCH. In addition, it can be mapped onto an MCCH, which is a logical channel, or a method of notifying by mapping it onto an IP header is conceivable. Receiving the E-MBMS contents, the mobile terminal 3 selects desired E-MBMS content to receive at step 3, and at step 4, it carries out processing of deciding on whether it can receive the E-MBMS content selected. The processing at step 4 will be described later in more detail with reference to FIG. 9. As a result of the decision at step 4, if the selected E-MBMS content is receivable, the mobile terminal 3 transmits an E-MBMS receiving request at step 5 to receive the E-MBMS content it desires to receive. The processing of transmitting the receiving request for receiving the E-MBMS content is referred to as entry. The entry is also referred to as subscribe or activation. The E-MBMS receiving request transmitted from the mobile terminal 3 is received by the service center 5. As for the entry, not only the service center 5 but also the base station 2 can receive it. In addition, the mobile terminal can also transmit to the base station 2 the counting for notifying of the start of receiving the E-MBMS content simultaneously with or independently of the entry.

FIG. 9 is a flowchart showing the details of the processing at step 4 of FIG. 8. At step 1 of FIG. 9, the mobile terminal makes a decision as to whether it can receive the desired E-MBMS content by comparing the frequency occupying bandwidth of the desired E-MBMS content with the receivable bandwidth of the mobile terminal. It makes the decision at step 1 by referring to the frequency occupying bandwidth, which is a parameter of FIG. 6. For example, when the receivable bandwidth of the mobile terminal is 10 MHz, it makes a decision that it cannot receive a movie with a content number CH3 whose frequency occupying bandwidth is 20 MHz. If the mobile terminal makes a decision that it can receive the desired E-MBMS content at step 1, it executes step 2. At step 2, it makes a decision as to whether the Unicast service is annexed to the desired E-MBMS content. To make the decision at step 2, it refers to the presence or absence of the annexed Unicast service, which is a parameter of FIG. 6. If the Unicast service is annexed to the desired E-MBMS content, step 3 is executed. On the other hand, unless the Unicast service is annexed, step 4 is executed.

At step 2, if the Unicast service is annexed to the desired E-MBMS content, the mobile terminal makes a decision at step 3 as to whether the E-MBMS data and the Unicast data can be received simultaneously. This is because the E-MBMS content having the Unicast service annexed is absolutely meaningless unless the mobile terminal can receive the E-MBMS data and the Unicast data simultaneously. The decision processing is made considering the processing capability of the hardware and software of the mobile terminal. As a result of the decision at step 3, if the mobile terminal is capable of receiving the E-MBMS data and the Unicast data simultaneously, it executes the processing at step 4. To make the decision at step 4, the mobile terminal refers to the E-MBMS service position, which is a parameter of FIG. 6. For example, the mobile terminal whose UE position is position 1 decides that it can receive a weather forecast with the content number CH1, a live baseball broadcast with CH2 and a mail order with CH4, whose E-MBMS service positions are 1. As a result of executing a series of steps 1 to 4, if the mobile terminal makes a decision that it can receive the desired E-MBMS content, the mobile terminal transmits an E-MBMS receiving request to the network side (step 5 of FIG. 8). On the other hand, if the mobile terminal makes a decision that it cannot receive the desired E-MBMS content at any one of the steps 1, 3 and 4, it makes a decision at step 4 of FIG. 8 that the desired E-MBMS content cannot be received.

At step 4 of FIG. 9, if the mobile terminal makes a decision from the E-MBMS service position and its own UE position that it cannot receive the desired E-MBMS content, it can decide that "it cannot receive at the current UE position" rather than completing the processing by simply making a decision that "it cannot receive". In this case, to make a request for changing the UE position to the base station, the mobile terminal notifies the base station of a "UE position shift request" to a desire E-MBMS service position. As a result of negotiation between the base station and mobile terminal, if the base station accepts the UE position shift request, the mobile terminal changes the UE position by shifting the center frequency by altering the set frequency of the frequency converting section 11, thereby offering an advantage of becoming able to receive the desired E-MBMS content. The processing is called retuning.

As described above, when using the E-MBMS service in the LTE communications system where the receivable bandwidth of the mobile terminal can differ from the bandwidth of the base station, the mobile terminal itself makes a decision as to whether it can receive the desired E-MBMS content considering its own capability. Thus, there is no longer any occasion for the mobile terminal to send to the network the receiving request for the E-MBMS content it cannot receive because of its incapability. Accordingly, it is advantageous in terms of making the effective use of the radio resources. In addition, when the desired E-MBMS content cannot be received because of the difference between the UE position of the mobile terminal and the position of the desired E-MBMS content (E-MBMS service position), it offers an advantage that the mobile terminal becomes able to receive the desired E-MBMS content by transmitting the UE position shift request to the base station.

Embodiment 2

In the embodiment 1, in the LTE communications system where the receivable bandwidth of the mobile terminal can differ from the bandwidth of the base station, the mobile terminal itself makes a decision as to whether it can receive the particular E-MBMS content or can receive the E-MBMS service and Unicast service simultaneously. Thus, to enable the mobile terminal to make the decision, the frequency occupying bandwidth of the E-MBMS content and the information on whether the Unicast service is annexed or not are added as parameters to the E-MBMS content table to be distributed from the network side to the mobile terminal. However, it is not necessary for the mobile terminal to perform the foregoing processing by itself, but the network side such as a base station, aGW or service center can perform it.

Next, a case will be described where the network side such as the base station, aGW or service center performs the processing of deciding on where the mobile terminal can receive the E-MBMS service or not. FIG. 10 is a diagram showing UE capability information (UE capability) transmitted from the mobile terminal. When the bandwidth of the base station 20 MHz and the receivable bandwidth of the mobile terminal is 10 MHz, there are some occasions in which the mobile terminal cannot receive the E-MBMS content (program) depending on the frequency occupying bandwidth they use. However, as to whether the mobile terminal can receive the E-MBMS content or not, the network side cannot decide unless it recognizes the receivable bandwidth of the mobile terminal. Thus, the mobile terminal transmits the receivable bandwidth to the network side such as the base station, aGW and service center as the UE capability information (UE Capability) to enable the network side to decide as to whether the mobile terminal can receive the particular E-MBMS content.

In addition, there are some cases where the Unicast service addressed to a particular mobile terminal is added to the E-MBMS content. However, unless the mobile terminal is capable of processing the E-MBMS service and Unicast service simultaneously within its hardware or software processing capability, it is meaningless to transmit to such a terminal the E-MBMS content to which the Unicast service is annexed. The network side, however, cannot decide as to whether the mobile terminal is capable of processing the E-MBMS service and the Unicast service simultaneously. Thus, the information indicating whether the mobile terminal is capable of processing the E-MBMS service and the Unicast service simultaneously is transmitted to the network side as the UE capability information. In addition, as the UE capability information, it is also possible to send the UE position (selected frequency band information) described in the embodiment 1. The foregoing parameters (receivable bandwidth, information on whether the simultaneous processing of the E-MBMS and Unicast is possible, and UE position) can be notified separately from the UE capability information. In addition, part of the foregoing parameters can be used rather than all of them. Although the foregoing description is made when the receivable bandwidth of the mobile terminal 10 MHz, the idea disclosed above is also applicable to the communications system in which the base station and mobile terminal have different bandwidths.

FIG. 10 is a diagram showing the UE capability information on the mobile terminal, which the network side refers to. The table shown in FIG. 10 includes the receivable bandwidth, and the information indicating whether the mobile terminal is capable of processing the E-MBMS service and the Unicast service simultaneously (such as receiving the E-MBMS data and Unicast data simultaneously), and the UE capability information is recorded with establishing correspondence with the mobile terminal. The table shown in FIG. 10 is referred to by the network side, and can be created based on the UE capability information transmitted from the mobile terminal to the network side. FIG. 11 is a flowchart for explaining the processing of the base station that makes a decision as to whether the mobile terminal can receive the E-MBMS service. At step 1 of FIG. 11, the mobile terminal 3 transmits the UE capability information (UE Capabilities) to the network such as the base station 2 and aGW 1. At step 2, the base station 2 receives the UE capability information from the mobile terminal 3. More specifically, the mobile terminal 3 notifies the base station of it in layer-3 message in accordance with a protocol called RRC (Radio Resource Control). Alternatively, a method is also conceivable which sends from the mobile terminal to the base station by MAC (Media Access Control) signaling. The UE capability information transmitted at step 1 includes the receivable bandwidth and the information on whether the mobile terminal is capable of processing the E-MBMS service and the Unicast service simultaneously.

At step 3, the network such as the service center 5 transmits the E-MBMS content table to the mobile terminal 3 via the base station 2 (eNodeB), for example. At step 4, the base station 2 receives the E-MBMS content table, and at step 5, the mobile terminal 3 receives the E-MBMS content table. Although the E-MBMS content table the mobile terminal 3 receives can include all or part of the three parameters consisting of the frequency occupying bandwidth, the information on the presence or absence of the annexed Unicast service and the E-MBMS service position as in the embodiment 1, this is not essential in the present embodiment. This is because the decision processing the mobile terminal makes by referring to the parameters in the embodiment 1 is carried out on the network side such as the base station 2. In this case, since the amount of information in the section (between the base station and mobile terminal) to be transmitted as a radio signal can be reduced, the present embodiment 2 has an advantage in the effective use of the radio resources. More specifically, the E-MBMS content table is sent from the network to the base station 2 as a layer-3 message according to the protocol called NBAP (NodeB Application Part), for example.

At step 6, the mobile terminal 3 selects E-MBMS content it desires to receive, and transmits an E-MBMS receiving request at step 7 to receive the E-MBMS content it desires to receive. More specifically, the mobile terminal 3 transmits the E-MBMS receiving request in terms of a layer-3 message in accordance with the protocol called RRC (Radio Resource Control), for example. Alternatively, a method of notifying in terms of the MAC signaling is also conceivable. The E-MBMS receiving request transmitted from the mobile terminal 3 is received by the base station 2 at step 8. It is conceivable that the E-MBMS receiving request employs the counting or entry (also referred to as Subscribe or Activation).

At step 9, referring to the table shown in FIG. 10, the base station 2 makes a decision as to whether the mobile terminal 3 is capable of receiving the desired E-MBMS content. More specifically, the base station 2 makes the decision as to whether the mobile terminal can receive the desired E-MBMS content considering: whether the desired E-MBMS content involves the Unicast service; the frequency occupying bandwidth of the desired E-MBMS content and the receivable bandwidth of the mobile terminal; and whether the mobile terminal can receive the E-MBMS data and the Unicast data simultaneously. In addition, when the UE position is notified, the base station 2 makes a decision considering the position of the E-MBMS content (E-MBMS service position) the mobile terminal selects and the UE position.

At step 9 of FIG. 11, if the base station decides that the mobile terminal 3 cannot receive the E-MBMS content the mobile terminal 3 selects, the base station 2 transmits an E-MBMS entry inhibiting notification to the mobile terminal 3 at step 10, and refuses the entry. On the other hand, if the base station decides at step 9 that the mobile terminal 3 can receive the E-MBMS content the mobile terminal 3 selects, the base station performs the E-MBMS service start processing for the mobile terminal 3. However, instead of completing the processing by transmitting the E-MBMS entry inhibiting notification as at step 10, the base station can make a decision that the mobile terminal "cannot receive at the current UE position". In this case, the base station makes a decision as to whether the mobile terminal can receive the desired E-MBMS content if the base station changes the UE position. If the mobile terminal can receive, the base station can carry out the processing in such a manner as to match the UE position to the E-MBMS service position (such as allowing retuning of the mobile terminal).

Although the foregoing description is made referring to the flowchart of FIG. 11, which shows the case where the base station 2 makes a decision as to whether a particular mobile terminal can receive the E-MBMS service, the aGW 1 or service center can also make the decision processing instead of the base station 2. FIG. 12 is a flowchart for explaining processing of the network that makes a decision as to whether a particular mobile terminal can receive the E-MBMS service. FIG. 12 differs in that each step the base station 2 executes in FIG. 11 is transferred to the network. However, since the contents of these steps are the same, their detailed description will be omitted here.

As described above, when using the E-MBMS service in the LTE communications system where the receivable bandwidth of the mobile terminal can differ from the bandwidth of the base station, the base station, aGW or service center can make a decision as to whether a particular mobile terminal can receive the desired E-MBMS content considering the capability of the mobile terminal. In addition, when the desired E-MBMS content cannot be received because of the difference between the UE position of the mobile terminal and the position of the desired E-MBMS content (E-MBMS service position), the base station which carries out the control in such a manner as to alter the UE position of the mobile terminal offers an advantage of being able to increase the variations of the E-MBMS contents the mobile terminal can utilize.

Embodiment 3

In the embodiments 1 and 2, in the LTE communications system where the receivable bandwidth of the mobile terminal can differ from the bandwidth of the base station, the decisions are made as to whether the mobile terminal can receive particular E-MBMS content, and whether it can receive the E-MBMS service and the Unicast service simultaneously. As for the foregoing decisions, the mobile terminal itself makes them in the embodiment 1, whereas the base station, aGW or service center makes them in the embodiment 2. In the following, a procedure will be described in which the mobile terminal that is receiving the E-MBMS data (including the control information) starts receiving the Unicast data such as telephone speech conversation.

Figure 13:
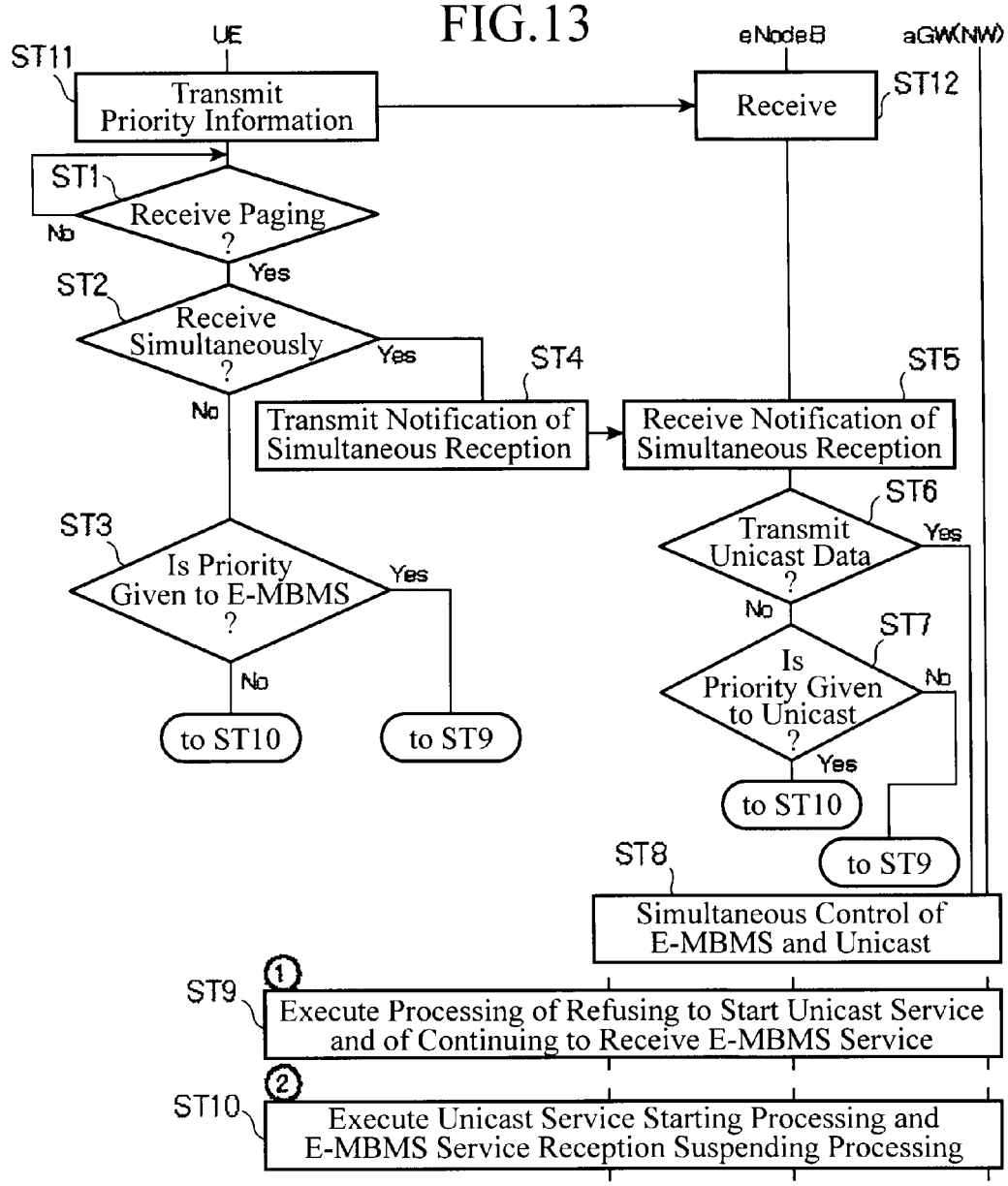
FIG. 13 is a flowchart for explaining the processing of making a decision as to whether the mobile terminal that is using the E-MBMS service can use Unicast service simultaneously or not.

FIG. 13 is a flowchart showing the processing the mobile terminal that is using the E-MBMS service executes for making a decision as to whether it will utilize the Unicast service. In FIG. 13, the user sends to the base station the priority information indicating which one of the E-MBMS service and the Unicast service is to be used preferentially (step 11). The base station receives the priority information transmitted from the mobile terminal (step 12). The priority information is sent to the base station according to the protocol called RRC (Radio Resource Control) as the layer-3 message. Alternatively, a method can also be used of sending it to the base station as the MAC (Media Access Control) signaling. If an incoming call such as telephone speech conversation occurs while the mobile terminal is receiving the E-MBMS content, control is carried out in accordance with the priority information in such a manner as to decide whether to give priority to receiving the E-MBMS content by refusing the incoming call of the telephone conversation, or to suspend receiving the E-MBMS content by accepting the arrival of the incoming telephone speech conversation.

Figure 14:
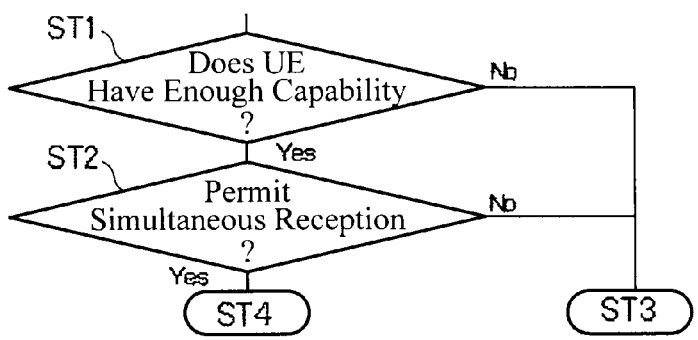
FIG. 14 is a flowchart for explaining the processing of making a decision as to whether the mobile terminal that is using the E-MBMS service can receive the Unicast data or not.

The mobile terminal that is receiving the E-MBMS content recognizes that each incoming call addressed to itself such as the telephone speech conversation occurs by receiving information (paging message or paging indicator) used for the incoming call processing (paging). At step 1 of FIG. 13, the mobile terminal makes a decision as to whether it receives the information used for the incoming call processing addressed to itself. If the mobile terminal receives the information used for the incoming call processing (Yes at step 1), the mobile terminal makes a decision at step 2 as to whether it receives the Unicast data in addition to the currently receiving E-MBMS data. The details of the decision processing at step 2 are shown in FIG. 14. FIG. 14 is a flowchart showing the processing of making a decision as to whether the mobile terminal that is using the E-MBMS service can receive the Unicast data. At step 1 of FIG. 14, the mobile terminal makes a decision as to whether its capability is enough for utilizing the E-MBMS service and the Unicast service simultaneously. If its capability is enough (Yes at step 1), the mobile terminal makes a decision at step 2 as to whether the user allows the simultaneous receiving of the E-MBMS service and the Unicast service.

If the user permits the simultaneous reception of the E-MBMS service and the Unicast service (Yes at step 2), the mobile terminal notifies the base station that it will receive the Unicast data to use the Unicast service simultaneously with the E-MBMS service (step 4 of FIG. 13). On the other hand, unless the capability of the mobile terminal is enough (No at step 1), or unless the user permits the simultaneous reception of the E-MBMS service and the Unicast service (No at step 2), the mobile terminal makes a decision as to whether the setting has been made to use the E-MBMS data preferentially between the E-MBMS service and the Unicast service (step 3 of FIG. 13). If the setting has been made to use the E-MBMS data preferentially (Yes at step 3), the processing refuses to receive the new incoming Unicast data, and continues to use the E-MBMS service (step 9). If the setting has been made to use the Unicast service preferentially (No at step 3), the processing of suspending receiving the E-MBMS data and the processing of receiving the Unicast data are executed (step 10).

Figure 15:
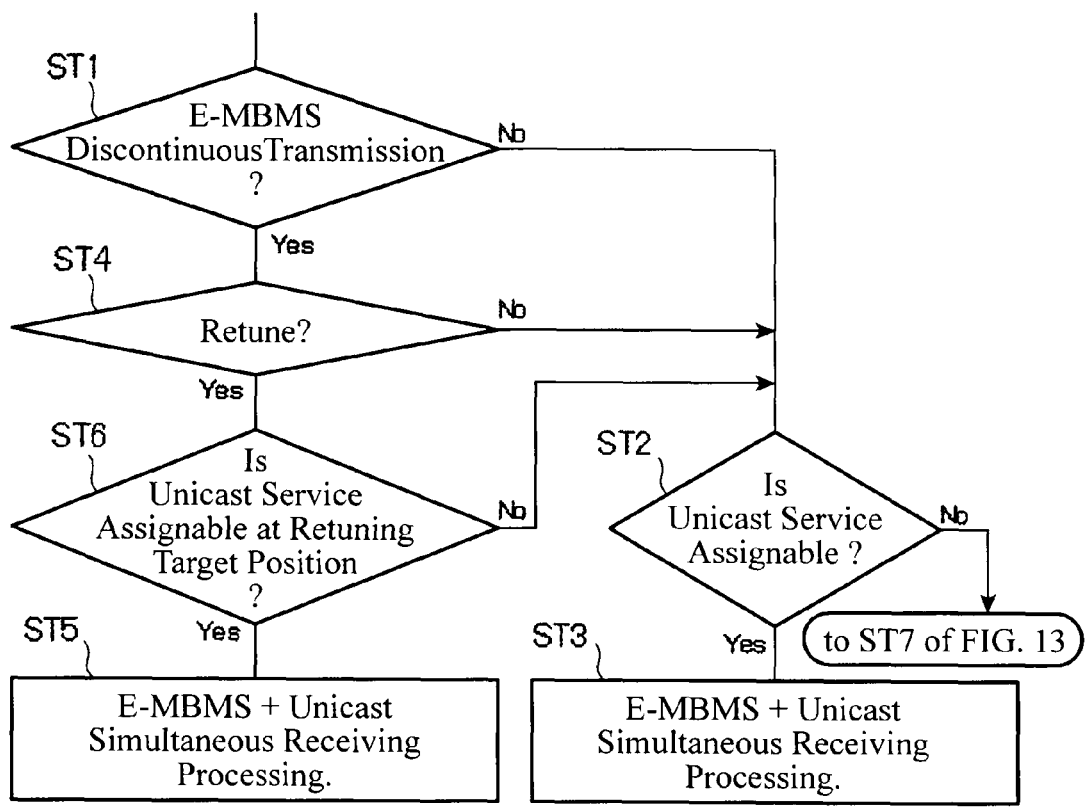
FIG. 15 is a flowchart for explaining the processing of making a decision whether to transmit the Unicast data to the mobile terminal that is using the E-MBMS service.
Figure 16:
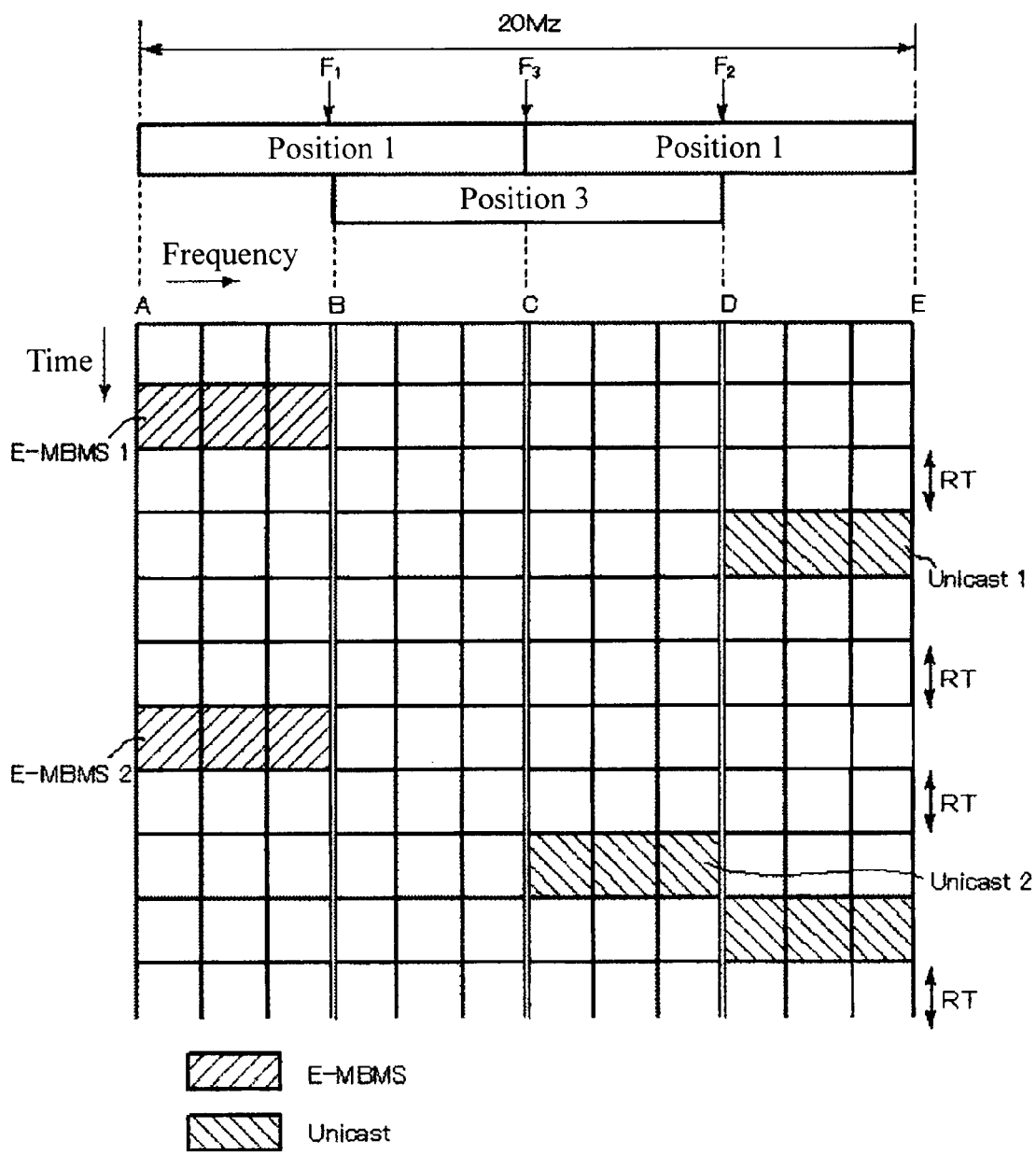
FIG. 16 is a diagram showing resource blocks for explaining an assignment of radio resources such as frequency and time when transmitting the E-MBMS data to the mobile terminal.
Figure 17:
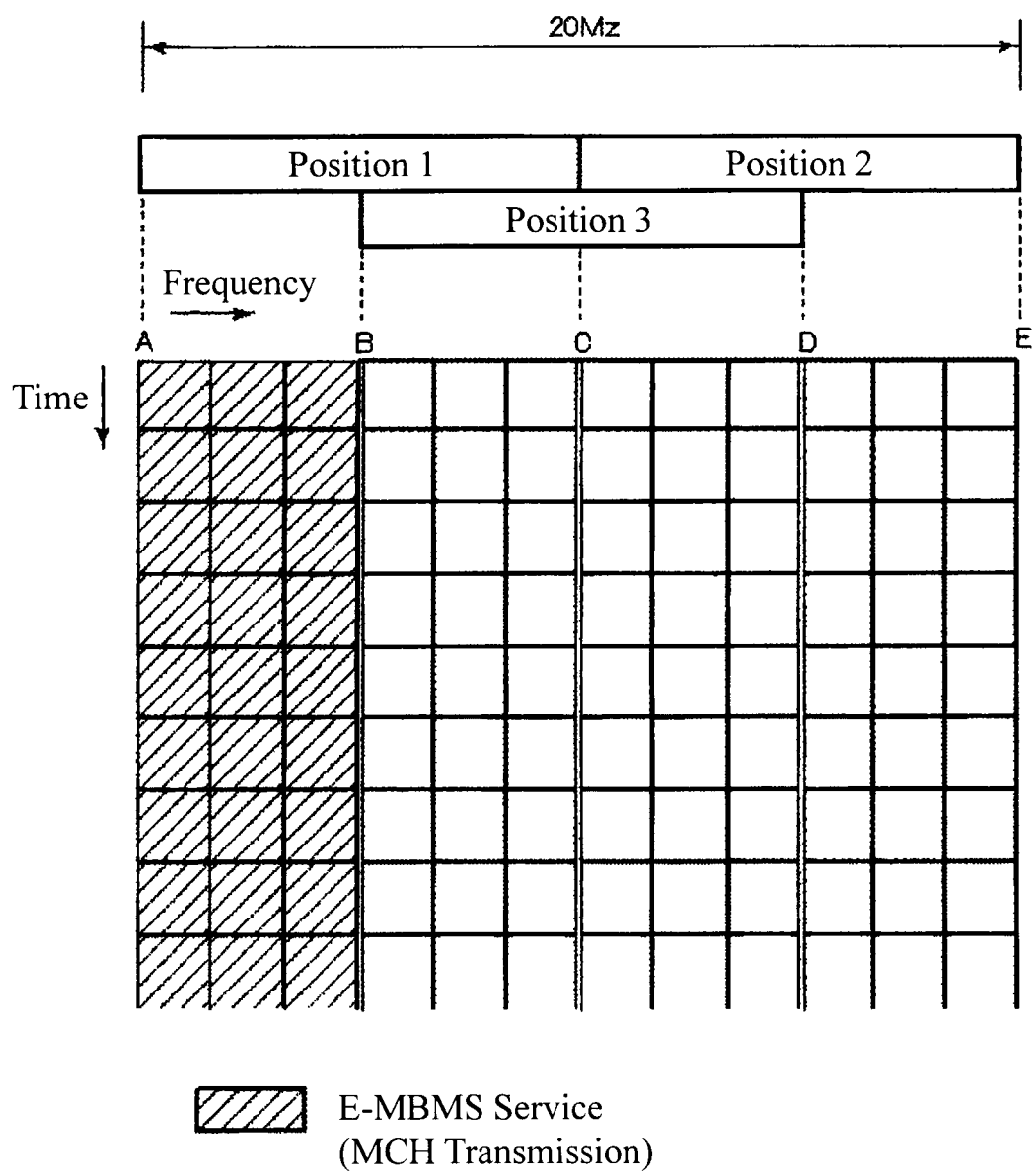
FIG. 17 is a diagram showing resource blocks for explaining an assignment of radio resources such as frequency and time when transmitting the E-MBMS data to the mobile terminal.

At step 4 of FIG. 13, to use the E-MBMS service and the Unicast service simultaneously, the mobile terminal notifies the base station that it will receive the Unicast data, and at step 5, the base station receives the notification transmitted from the mobile terminal. The base station makes a decision at step 6 as to whether to transmit the Unicast data to the mobile terminal. The details of the decision processing at step 6 are shown in FIG. 15. FIG. 15 is a flowchart showing the processing of making a decision whether to transmit the Unicast data to the mobile terminal that is utilizing the E-MBMS service. At step 1 of FIG. 15, to decide on whether the reception of the Unicast data is possible by retuning, the base station makes a decision as to whether the E-MBMS service is discontinuous transmission or not. FIG. 16 and FIG. 17 are diagrams showing resource blocks for explaining the assignment of the radio resources such as frequency and time when transmitting the E-MBMS data to the mobile terminal. In FIG. 16, the horizontal axis designates frequency. The bandwidth of the base station is 20 MHz of A-E. The vertical axis indicates time. When the receivable bandwidth of the mobile terminal is 10 MHz, since it cannot receive the full band at once of the bandwidth of the base station of 20 MHz of A-E, it carries out the communications using the 10 MHz frequency range. Depending on the manner of setting the center frequency, position 1 (frequency band A-C and center frequency F1), position 2 (frequency band C-E and center frequency F2), and position 3 (frequency band B-D and center frequency F3) in FIG. 16 can become the frequency band the mobile terminal can receive.

In the example shown in FIG. 16, the E-MBMS content is assigned to the position 1 (that is, the position 1 is the E-MBMS service position), and are transmitted discontinuously on the time axis of the vertical axis. Thus, when making the decision at step 1 of FIG. 15, if the E-MBMS service is transmitted discontinuously as shown in FIG. 16 and the discontinuous interval ensures enough time (details thereof will be described later) for the mobile terminal to perform retuning, the base station decides that the mobile terminal can receive the Unicast data assigned to a different position by altering the UE position by shifting the center frequency by the retuning. On the other hand, it is found in the example shown in FIG. 17 that the E-MBMS content is assigned to the position 1 and is transmitted continuously on the time axis of the vertical axis. When the E-MBMS content is transmitted continuously as shown in FIG. 17, there is no timing of retuning and receiving the Unicast data assigned to the different position. Accordingly, when making the decision at step 1 of FIG. 15, if the E-MBMS service is transmitted continuously on the time axis as shown in FIG. 17, the base station decides that receiving the Unicast data assigned to the different position is impossible by the retuning. Incidentally, if the E-MBMS uses the frequency band A-B and the Unicast uses the frequency band B-C, for example, since the frequency band B-C is included in the receivable bandwidth of the mobile terminal A-C (10 MHz), the mobile terminal can receive the Unicast data assigned to the frequency band B-C simultaneously regardless of the presence or absence of the transmission of the E-MBMS data.

The processing at step 1 can also consider an intention or capability of the mobile terminal as to whether to perform the retuning or not. As for a concrete notification method of the intention of the mobile terminal, the mobile terminal notifies the base station of it in a layer-3 message according to the protocol called RRC (Radio Resource Control). Alternatively, the mobile terminal can notify the base station of it in MAC (Media Access Control) signaling, or a method is conceivable of mapping onto a physical channel. The intention or capability of the mobile terminal can be sent as UE capability information or as another parameter. As concrete processing content, when the E-MBMS is transmitted discontinuously at step 1, the base station checks the intention or capability of the mobile terminal. In this case, if "retuning is not allowed (or retuning is impossible)", a decision of "No" is made at step 1, and the processing proceeds to step 2. If "retuning is allowed (or retuning is possible)", a decision of "Yes" is made at step 1, and the processing proceeds to step 4. Causing the mobile terminal to perform retuning in a short time (in a resource block unit) will increase the processing load of the control section 15 or frequency converting section 11. Accordingly, considering the intention or capability of the retuning of the mobile terminal has an advantage.

Figure 18:
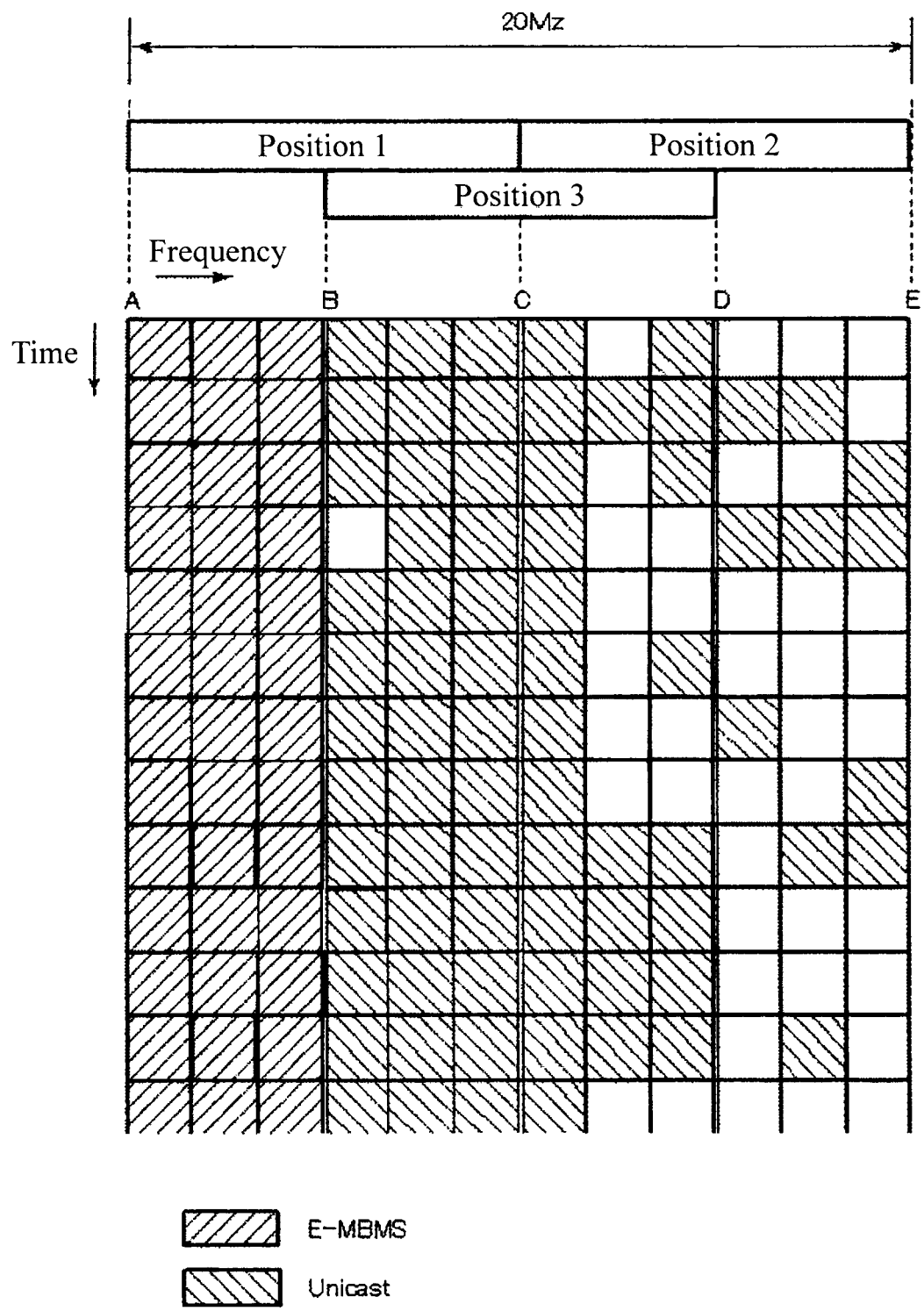
FIG. 18 is a diagram showing a case incapable of transmitting the Unicast data at an E-MBMS service position.
Figure 19:
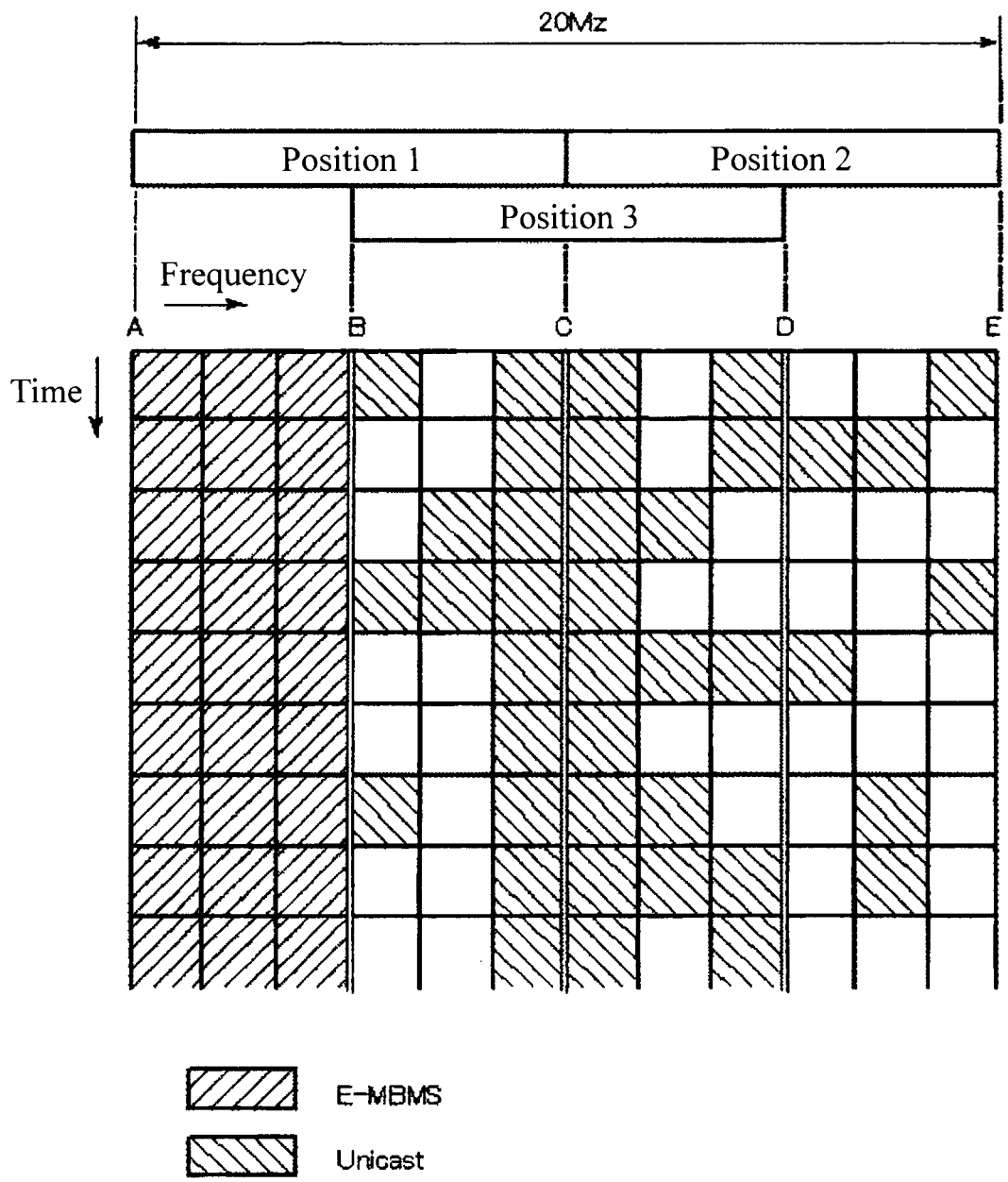
FIG. 19 is a diagram showing a case capable of transmitting the Unicast data at the E-MBMS service position.

Making a decision at step 1 that receiving the Unicast data assigned to the different position is impossible because the E-MBMS is transmitted continuously (No step 1), the base station makes a decision at step 2 whether it is possible to assign the Unicast data to the E-MBMS service position. FIG. 18 and FIG. 19, which are diagrams showing the resource blocks, are diagrams showing whether the Unicast data is assignable to the E-MBMS service position. FIG. 18 is a diagram showing a case where the Unicast data cannot be assigned to the E-MBMS service position; and FIG. 19 is a diagram showing a case where the Unicast data can be assigned to the E-MBMS service position. In FIG. 18, the E-MBMS service position is the position 1 (10 MHz), that is, the frequency band A-C of FIG. 18, and the E-MBMS content is continuously transmitted using the frequency band A-B (represented as 5 MHz in FIG. 18) in the position 1. In addition, it is found that the transmission of the control data and user data of the Unicast service is assigned to the frequency band B-C in the position 1.

It is found in FIG. 18 that since only few vacant resource blocks are present in the frequency band B-C, the downlink transmission assigned by the scheduling is congested in the frequency band of the E-MBMS service position. In such a case, new Unicast data cannot be assigned to the E-MBMS service position. When there are no resource blocks in the E-MBMS service position to which the new Unicast data is to be assigned, the base station makes a decision that the assignment of the Unicast data to the E-MBMS service position is impossible (No at step 2). Thus, at step 7 of FIG. 13, one of the E-MBMS service and Unicast service, which is set to be received preferentially by the user, is started or continued.

If a decision of "No" is made at step 2 of FIG. 15, the following processing can also be executed. First processing is to execute the E-MBMS service at a different position (in the case of FIG. 18, D-E in the position 2, for example). This makes both the position 1 and position 2 the E-MBMS service position. Thus, passing through the negotiation with the base station, the mobile terminal carries out the retuning only once which shifts the UE position from the position 1 to the position 2, and the processing proceeds to step 3. This enables the mobile terminal to receive the Unicast service at the position 2 while receiving the E-MBMS service in the position 2. In second processing, passing through the negotiation with the base station, the mobile terminal carries out the retuning only once which shifts to a position (position 2 in the case of FIG. 18, for example) including resource blocks to which new Unicast data is to be assigned, and the processing proceeds to step 3. Even in the case of multi-cell transmission, the base station maps the E-MBMS data onto a DL-SCH and transmits. Sending the scheduling information (such as frequency and timing) about the E-MBMS data mapped onto the DL-SCH and Unicast data from the base station to the mobile terminal enables the mobile terminal to receive the Unicast service at the position 2 while receiving the E-MBMS service in the position 2. In addition, sending the scheduling information (such as frequency and timing) from the base station to a plurality of mobile terminals enables the mobile terminals to which the information is sent to receive the E-MBMS data mapped onto the DL-SCH at the position 2. Adding the first processing and/or second processing has an advantage of being able to receive the E-MBMS service and the Unicast service simultaneously as compared with the case of advancing the processing to step 7 of FIG. 13 if the decision of "No" is made at step 2 of FIG. 15.

On the other hand, in FIG. 19, as in FIG. 18, the E-MBMS service position is the position 1 (10 MHz), that is, the frequency band A-C, and the E-MBMS content is continuously transmitted using the frequency band A-B (represented as 5 MHz in FIG. 19) in the position 1. In addition, it is found that the transmission of the control data and user data of the Unicast service is assigned to the frequency band B-C in the position 1. In FIG. 19, however, since the frequency band B-C has vacant resource blocks, the new Unicast data can be assigned within the E-MBMS service position. When the E-MBMS service position includes the resource blocks to which the new Unicast data can be assigned, a decision is made that the assignment of the Unicast data to the E-MBMS service position is possible (Yes at step 2), and step 3 is executed. Conversely, if a decision is made at step 2 of FIG. 15 that that the assignment of the Unicast data to the E-MBMS service position is impossible, the processing at step 7 of FIG. 13 is executed. Since the processing at step 7 of FIG. 13 is the same as the processing at step 3 of FIG. 13, the description there of is omitted here.

When the E-MBMS uses the frequency band A-B and the Unicast uses the frequency band B-C, even if the E-MBMS is transmitted continuously, as long as the receivable bandwidth of the mobile terminal is within A-C (10 MHz), the mobile terminal can receive the E-MBMS data and the Unicast data to enjoy both the services. Accordingly, when the E-MBMS is transmitted continuously at step 1 (No at step 1), and the E-MBMS service position includes the resource blocks to which the new Unicast data is to be assigned at step 2 (Yes at step 2), the base station arranges a schedule at step 3 for transmitting the Unicast data to the mobile terminal that is receiving the E-MBMS data, and assigns the new Unicast data to the resource blocks. In this case, the mobile terminal can receive the E-MBMS data and the Unicast data without altering the UE position by the retuning. Here, the processing at step 3 of FIG. 15 corresponds to the processing at step 8 of FIG. 13.

On the other hand, when making a decision at step 1 of FIG. 15 that the E-MBMS is transmitted discontinuously and the Unicast data can be received by shifting the UE position by the retuning (Yes at step 1), the base station makes a decision at step 4 on whether it causes the mobile terminal to perform retuning in practice. According to the downlink quality information (Channel Quality Indicator) transmitted from the mobile terminal, the base station can grasp the frequency characteristics or quality of every frequency band (such as A-B, B-C, C-D and D-E) of the resource blocks shown in FIG. 16, for example. Accordingly, if the quality of the frequency bands C-D and D-E are not good, the base station can decide that causing the mobile terminal to receive the Unicast data by retuning is not preferable. In addition, when the position 2 of FIG. 16 (position other than the E-MBMS service position) is congested, the mobile terminal does not need to perform retuning because it will come to schedule the Unicast data in the E-MBMS service position. At step 4, unless the base station makes a decision that it causes the mobile terminal to perform retuning (No at step 4), the processing at step 2 is executed. On the other hand, if the base station makes a decision that it causes the mobile terminal to perform retuning (Yes at step 4), the processing at step 6 is executed.

At step 6, the base station makes a decision as to whether the Unicast data can be assigned to a retuning target position. Although the base station makes a decision at step 6, as at step 2, as to whether there are resource blocks to which the new Unicast data is to be assigned, step 6 differs from step 2, which refers to the vacancy of the resource blocks in the E-MBMS position, in that step 6 refers to the vacancy of the resource blocks in the retuning target position. In addition, the base station refers to the vacancy of the resource blocks in the retuning target position at step 6 considering the time taken by the mobile terminal to achieve the retuning.

Incidentally, the mobile terminal carries out the retuning for altering the UE position from the position 1 to the position 2 by changing the reference frequency generated by the frequency converting section 11 from F1 to F2 (FIG. 16). However, when the frequency converting section 11 changes the reference frequency from F1 to F2, it takes a certain period of time to generate the retuning target frequency F2 stably. Taking account of such characteristics of the mobile terminal, the base station arranges the schedule considering the time the mobile terminal takes to perform the retuning. More specifically, as shown in FIG. 16, to cause the mobile terminal that is receiving the E-MBMS 1 at the position 1 to retune to the position 2 to receive the Unicast 1, the base station arranges the schedule in such a manner as to assign the newly generated Unicast 1 to the resource block separated from the communications timing of the E-MBMS 1 by time RT (time necessary for the mobile terminal to perform retuning). As for the scheduling of Unicast 2, it is also arranged in such a manner that the Unicast 2 is assigned to the resource block separated from the communications timing of the E-MBMS 2 by time RT. Even if there are vacant resource blocks at the retuning target position, unless the time RT can be reserved, the base station can make a decision that the assignment of the Unicast data at the retuning target position is impossible, or that the assignment is possible allowing for the quality deterioration. Likewise, when retuning from the position 2 to the position 1, the mobile terminal takes a certain period of time for the retuning. Accordingly, the base station must carry out the scheduling considering the time the mobile terminal takes for the retuning.

At step 6, if the base station makes a decision that the assignment of the Unicast data is possible at the retuning target position (Yes at step 6), the processing at step 5 is executed. If it makes the decision that the assignment is impossible (No step 6), the processing at step 2 is executed. At step 5, to transmit the Unicast data to the mobile terminal that is receiving the E-MBMS data, the base station assigns the newly generated Unicast data to a resource block in the position other than the E-MBMS position and at the timing different from the timing of the E-MBMS data. According to such scheduling processing executed by the base station, the mobile terminal retunes to the E-MBMS service position for receiving the E-MBMS data, and to the position to which the Unicast data is assigned for receiving the Unicast data, thereby receiving the E-MBMS data and the Unicast data at different timing. Thus, the mobile terminal can utilize both the E-MBMS service and Unicast service. Here, the processing at step 5 of FIG. 15 corresponds to the processing at step 8 of FIG. 13. The sequence of the processing of FIG. 15 is not necessarily the same as the sequence described above. For example, the processing at step 2 is executed, first, and the processing proceeds to step 3 when the decision of Yes is made at step 2. If the decision of No is made at step 2, the processing at step 1, step 4 and step 6 is executed, and the processing at step 5 is performed when the decision of Yes is made at step 6. If the decision of No is made at step 1 or at step 4 or 6, the processing at step 7 of FIG. 13 is executed.

Figure 20:
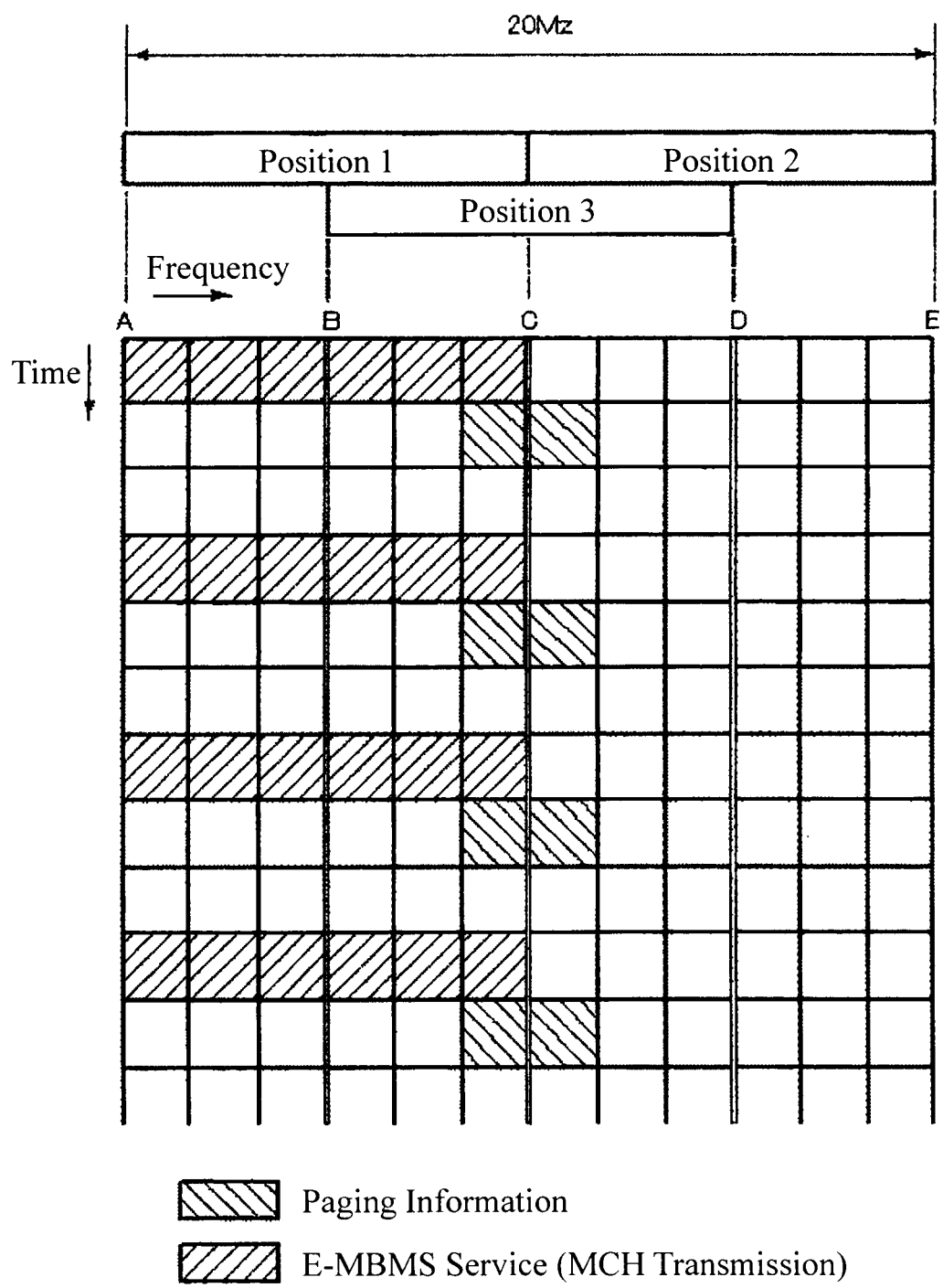
FIG. 20 is a diagram showing resource blocks for explaining an assignment of the radio resources such as frequency and time when transmitting information used for the incoming call processing to the mobile terminal that is receiving the E-MBMS data.
Figure 21:
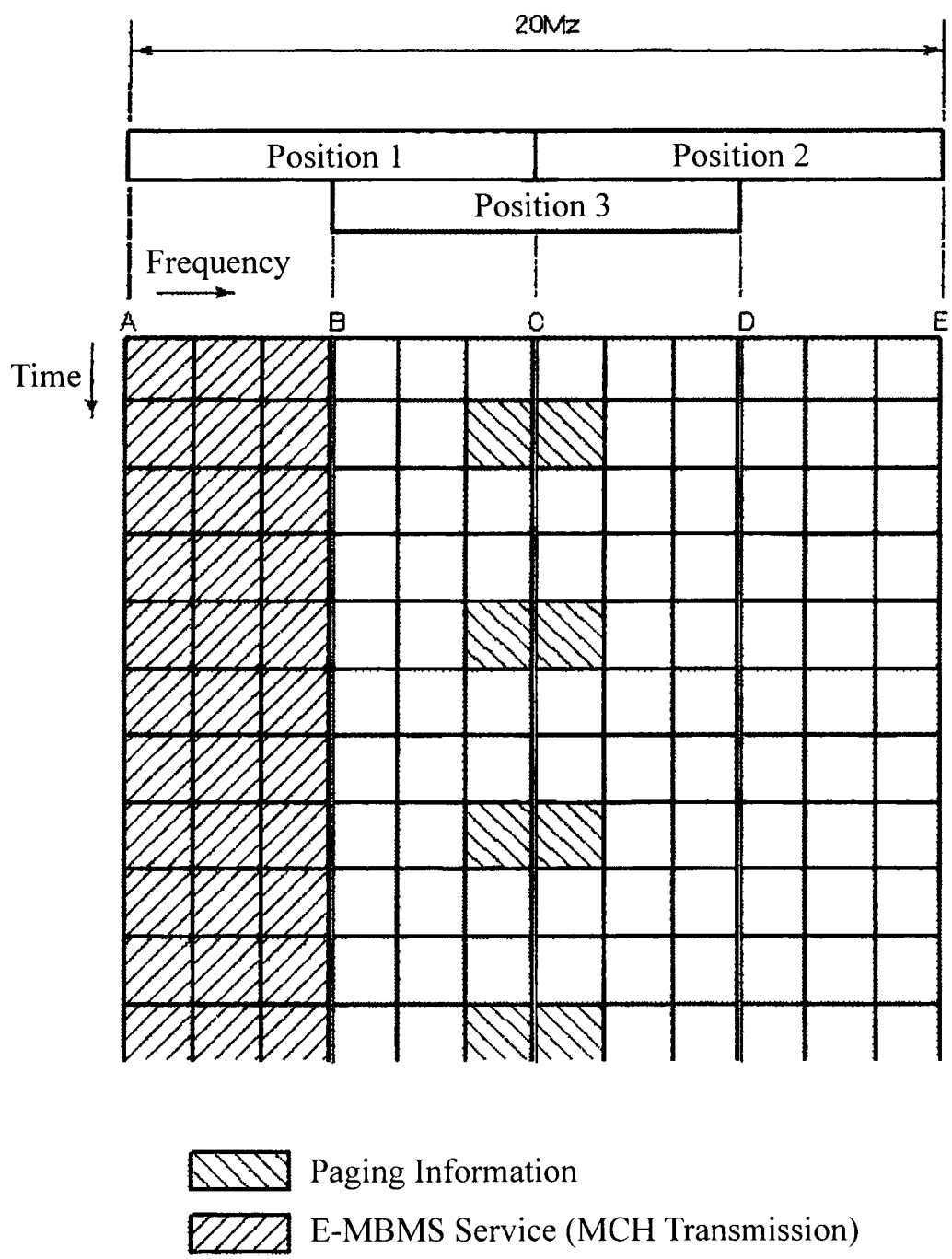
FIG. 21 is a diagram showing resource blocks for explaining an assignment of the radio resources such as frequency and time when transmitting information used for the incoming call processing to the mobile terminal that is receiving the E-MBMS data.

At step 1 of FIG. 13, the mobile terminal makes a decision on whether it receives the information (such as a paging message and a paging indicator) used for the incoming call processing (paging). As for the information used for the incoming call processing, the base station transmits it in the following method so that the mobile terminal that is receiving the E-MBMS data can receive it. This is necessary to solve the problems peculiar to the LTE in that the mobile terminal cannot receive the data transmitted from the base station at the very time at a position other than the UE position, and that the receivable bandwidth of the mobile terminal can be narrower than the bandwidth of the base station. FIG. 20 and FIG. 21 are diagrams showing resource blocks for explaining the assignment of the radio resources such as frequency and time when transmitting the information used for the incoming call processing to the mobile terminal that is receiving the E-MBMS data. In FIG. 20, the E-MBMS content is transmitted discontinuously using the frequency band A-C (10 MHz). In other words, the E-MBMS service position is position 1, and the mobile terminal that is receiving the E-MBMS data receives in the frequency band of the position 1. As for the information used for the incoming call processing, the base station transmits it using individual positions so that the mobile terminal can receive it regardless of the position (UE position, selected frequency band) the mobile terminal selects. In the case of FIG. 20, the frequency band B-D on which the position 1, position 2 and position 3 overlap is used so that the information is assigned to a plurality of resource blocks in such a manner that it is transmitted discontinuously at timing different from the timing of the E-MBMS. Thus, the same information is transmitted using a plurality of resource blocks.

FIG. 21 is a diagram showing the case of transmitting the E-MBMS content continuously using the frequency band A-B. Since the E-MBMS content is transmitted continuously, the base station cannot transmit the information used for the incoming call processing with shifting the timing from the transmission timing of the E-MBMS content. However, since the E-MBMS content is assigned to only the frequency band A-B in the position 1 (A-C), the information used for the incoming call processing can be assigned to the frequency band B-C in the position 1. In FIG. 21, as in FIG. 20, the base station transmits the information used for the incoming call processing using the individual positions so that the mobile terminal can receive it regardless of the position (UE position) the mobile terminal selects. In the case of FIG. 21, the frequency band B-D on which the position 1, position 2 and position 3 overlap is used so that the information is assigned to the resource blocks in such a manner that it is transmitted discontinuously at timing different from the timing of the E-MBMS. In this case also, the information used for the same incoming call processing is transmitted using the plurality of resource blocks.

Figure 22:
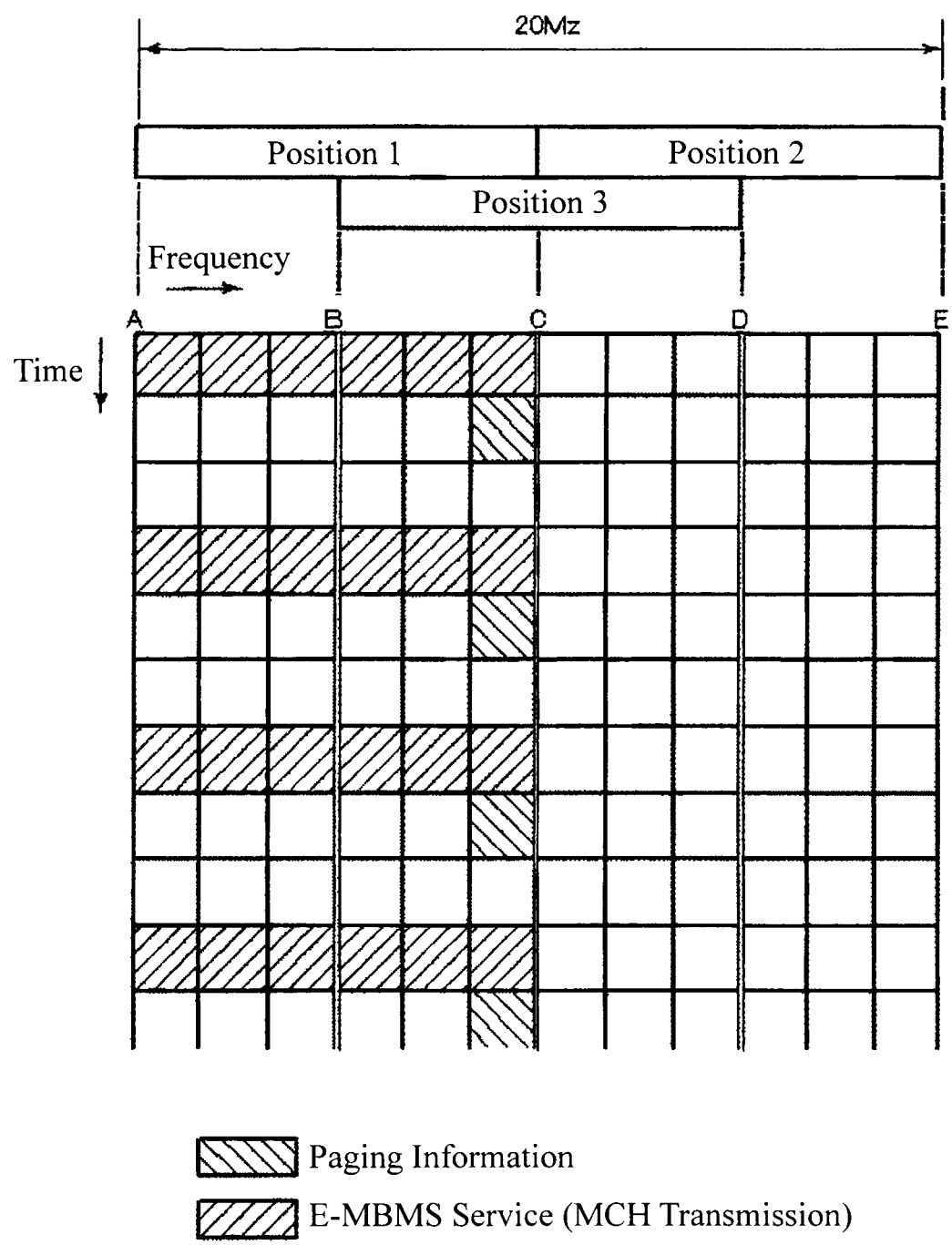
FIG. 22 is a diagram showing resource blocks for explaining an assignment of the radio resources such as frequency and time when transmitting information used for the incoming call processing to the mobile terminal that is receiving the E-MBMS data.
Figure 23:
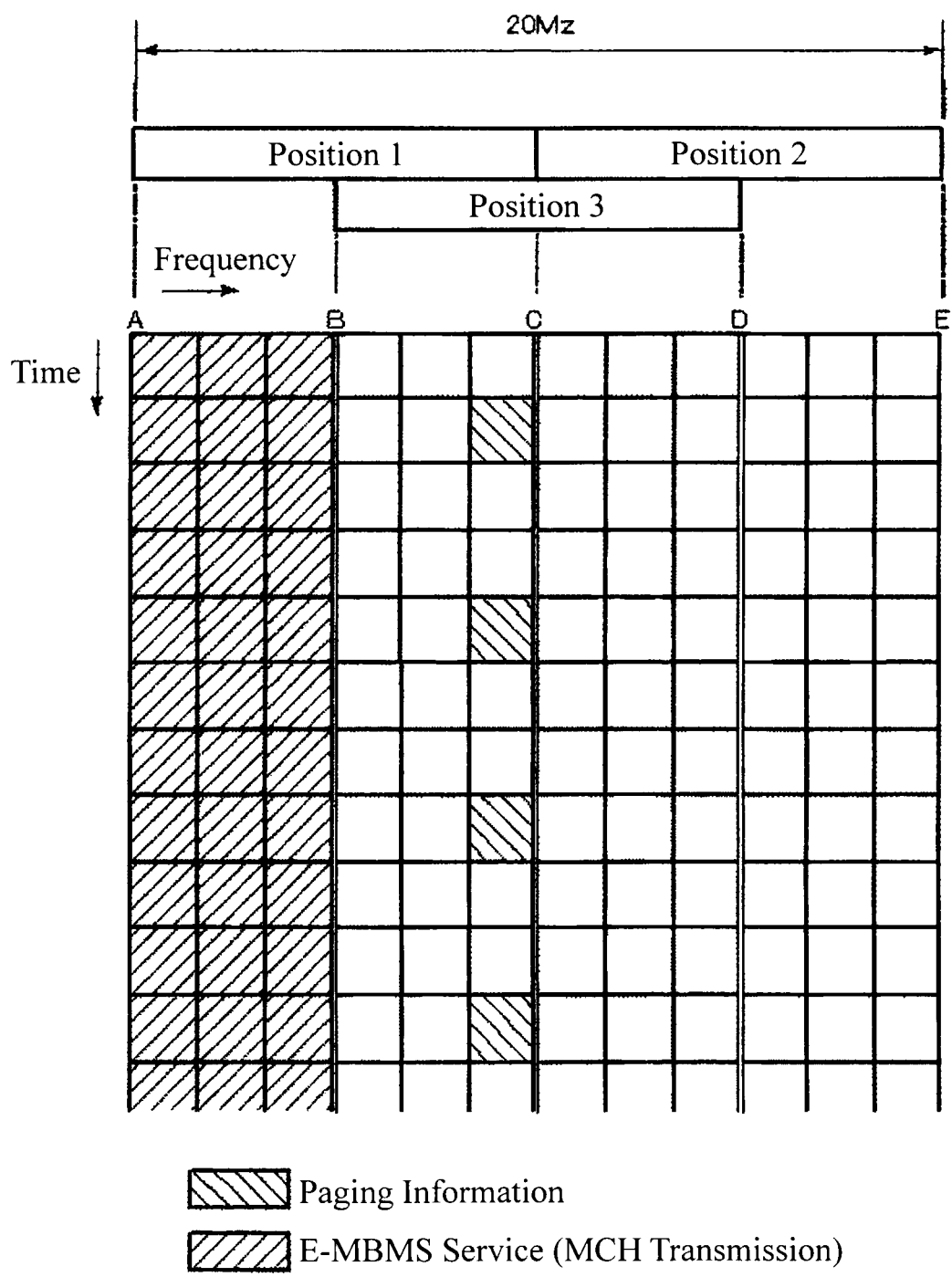
FIG. 23 is a diagram showing resource blocks for explaining an assignment of the radio resources such as frequency and time when transmitting information used for the incoming call processing to the mobile terminal that is receiving the E-MBMS data.

FIG. 22 and FIG. 23 are diagrams showing resource blocks for explaining the assignment of the radio resources such as frequency and time when transmitting the information (such as a paging message and a paging indicator) used for the incoming call processing (paging) to the mobile terminal that is receiving the E-MBMS data. In FIG. 22, the E-MBMS content is transmitted discontinuously using the frequency band A-C (position 1). The information used for the incoming call processing is assigned to such resource blocks that will transmit it discontinuously at the timing different from the timing of the E-MBMS in the E-MBMS service position. In FIG. 20, although the information used for the incoming call processing is assigned to the resource blocks in the frequency band B-D on which the position 1, position 2 and position 3 overlap so that the mobile terminal can receive it regardless of the position (UE position, selected frequency band) the mobile terminal selects, FIG. 22 differs in that the information used for the incoming call processing is assigned to the E-MBMS service position. Accordingly, being different from the cases shown in FIGS. 20 and 21, it is not necessary to assign the information used for the incoming call processing to a plurality of resource blocks, and this will contribute to the efficient use of the radio resources. FIG. 23 is a diagram showing a case where the E-MBMS content is transmitted continuously. Since the E-MBMS content is assigned to only the frequency band A-B in the position 1 (A-C), the information used for the incoming call processing is assigned to the frequency band B-C in the position 1. In this case, the mobile terminal can receive without any problem because the receivable bandwidth thereof is 10 MHz. As FIG. 22, FIG. 23 is also characterized by assigning the information used for the incoming call processing to the E-MBMS service position, and has an advantage in the efficient use of the radio resources. Although the information used for the incoming call processing is assigned to the E-MBMS service position, it is also conceivable to always assign the information used for the incoming call processing to the same range on the frequency axis as the E-MBMS content (program) the mobile terminal is receiving in the E-MBMS service position. This will reduce the frequency range the mobile terminal must handle in the receiving processing, and hence is expected to give an advantage of reducing the processing load of the demodulating section 13 and control section 15.

Figure 24:
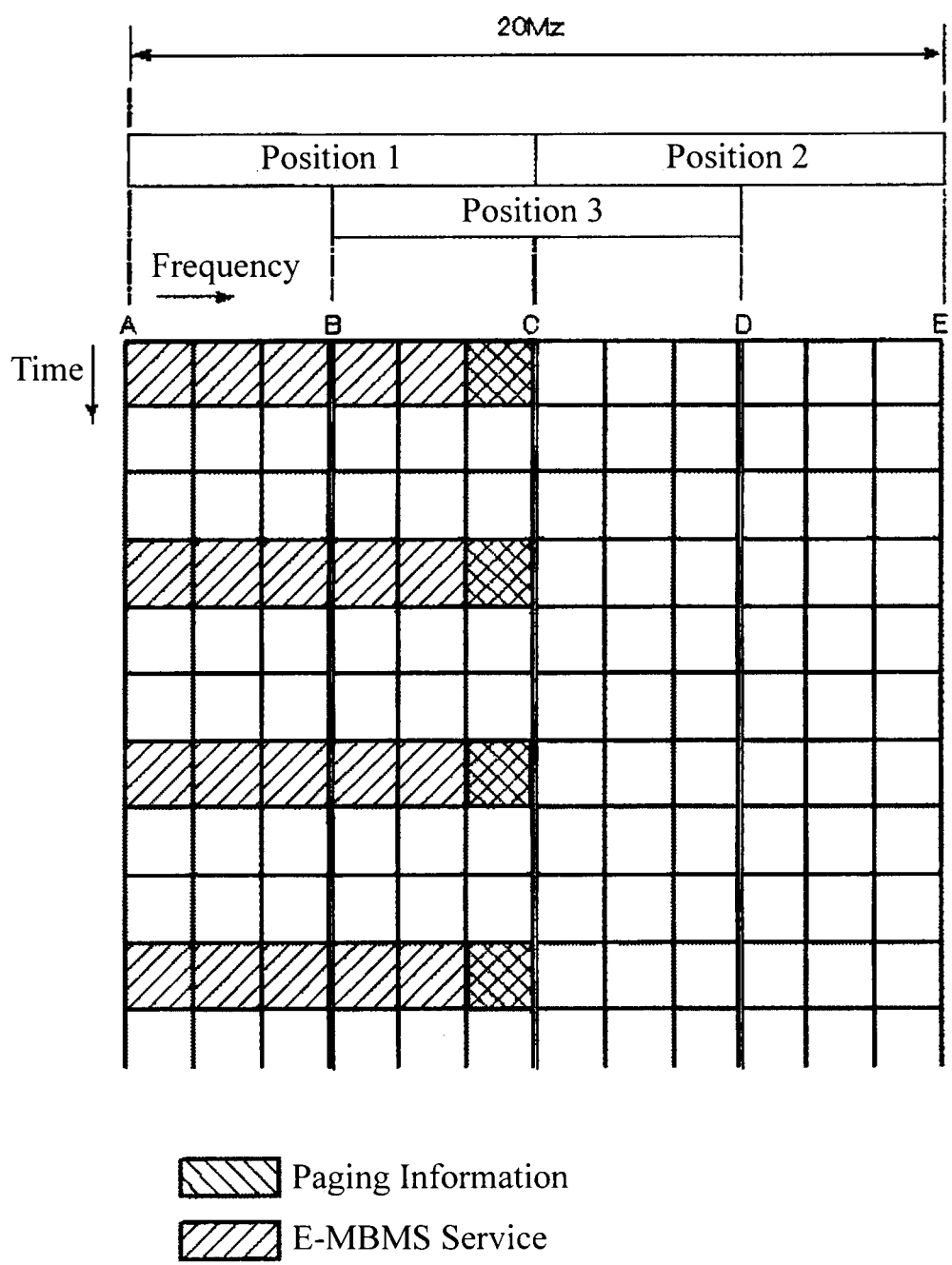
FIG. 24 is a diagram showing resource blocks for explaining an assignment of the radio resources such as frequency and time when transmitting information used for the incoming call processing to the mobile terminal that is receiving the E-MBMS data.
Figure 25:
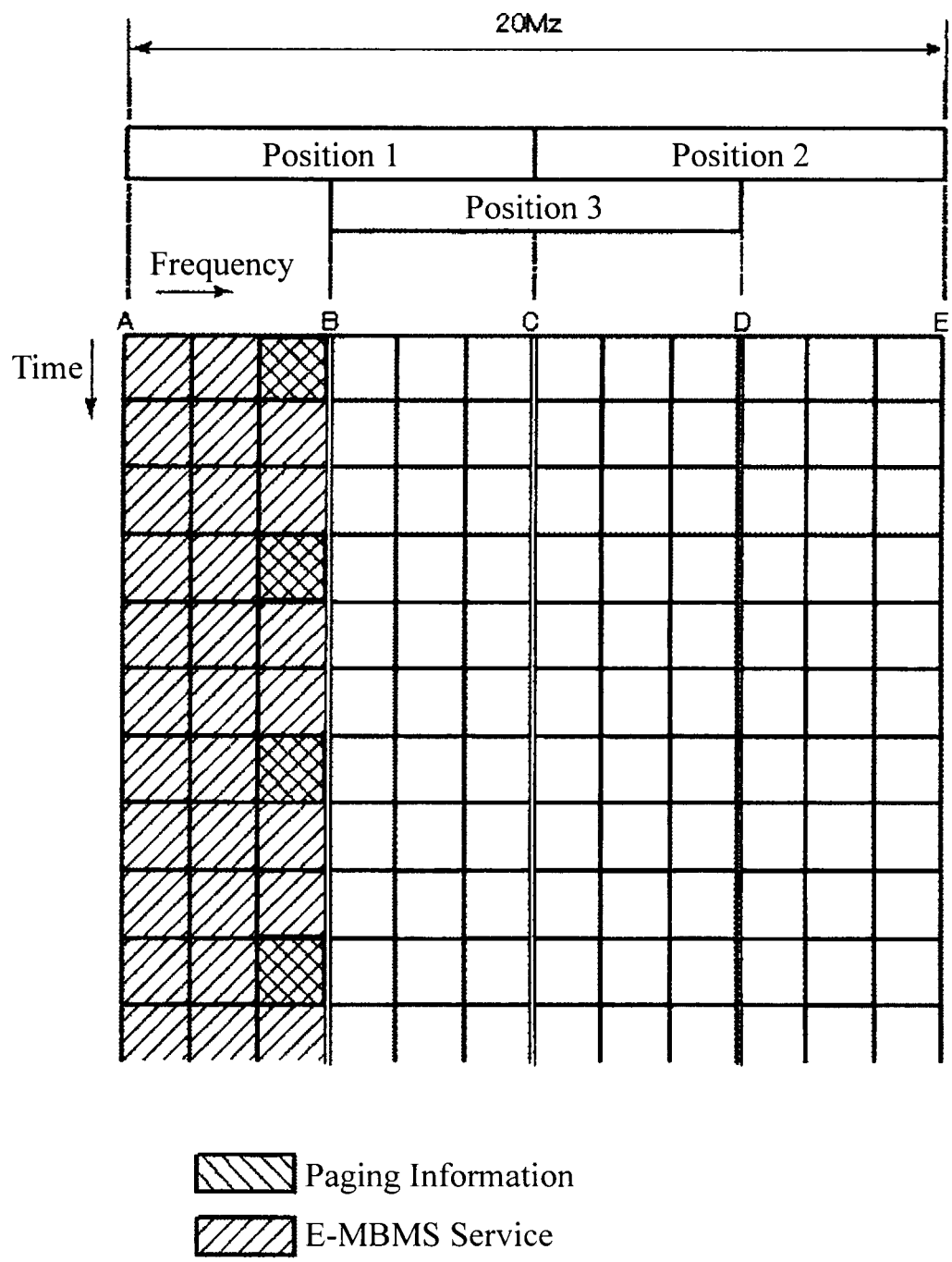
FIG. 25 is a diagram showing resource blocks for explaining an assignment of the radio resources such as frequency and time when transmitting information used for the incoming call processing to the mobile terminal that is receiving the E-MBMS data.

FIG. 24 and FIG. 25 are diagrams showing resource blocks for explaining the assignment of the radio resources such as frequency and time when transmitting the information used for the incoming call processing to the mobile terminal that is receiving the E-MBMS data. In FIG. 24, the E-MBMS content is transmitted discontinuously using the frequency band A-C (position 1). Then the information used for the incoming call processing is sent to the mobile terminal as part of the E-MBMS content. More specifically, the information used for the incoming call processing of the mobile terminal that is receiving the E-MBMS service is mapped onto an MCH (Transport Channel). The MCH will be described below as an example of a shared channel for the content transmission. Alternatively, the information is placed on an MCCH (Logical Channel) or MTCH (Logical Channel). In other words, an eNodeB carrying out the media access control, an aGW executing the paging processing, or a higher rank network apparatus, receiving the counting or entry (Subscribe or Activation) about the E-MBMS content from the mobile terminal, transmits the information used for the incoming call processing of the mobile terminal that is receiving the E-MBMS service via an MCH rather than a PCH. Alternatively, it can be transmitted via an MCCH or MTCH rather than a PCCH. At this time, the information used for the incoming call processing for the mobile terminal that is not receiving the E-MBMS service is transmitted via the PCH as usual. Thus, transmitting the information used for the incoming call processing to the mobile terminal via the MCH or MCCH or MTCH as part of the E-MBMS data enables the mobile terminal that is receiving the E-MBMS service to receive the information used for the incoming call processing if it is receiving the E-MBMS service data. In this respect, it is possible to simplify the paging receiving processing during the reception of the E-MBMS service by the mobile terminal. FIG. 25 is a diagram showing a case where the E-MBMS content is transmitted continuously. The E-MBMS content is assigned to only the frequency band A-B in the position 1 (A-C), and the information used for the incoming call processing is transmitted using the MCH or MCCH or MTCH rather than the PCH, which is the same as in FIG. 24.

Figure 26:
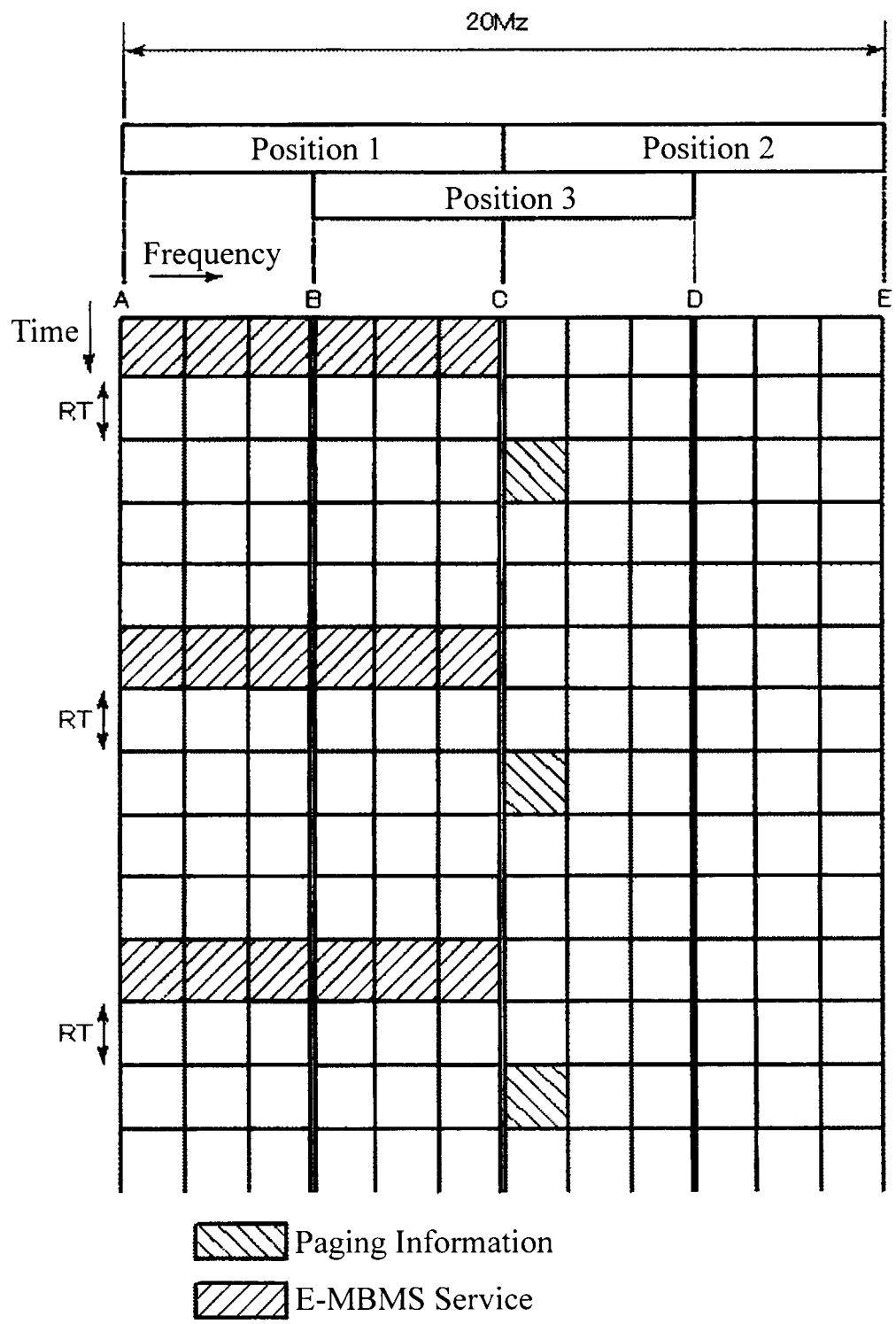
FIG. 26 is a diagram showing resource blocks for explaining an assignment of the radio resources such as frequency and time when transmitting information used for the incoming call processing to the mobile terminal that is receiving the E-MBMS data.

FIG. 26 is a diagram showing resource blocks for explaining the assignment of the radio resources such as frequency and time when transmitting the information used for the incoming call processing to the mobile terminal that is receiving the E-MBMS data. In FIG. 26, the E-MBMS content is transmitted discontinuously using the frequency band A-C (position 1). Then the information used for the incoming call processing is assigned to resource blocks that will be transmitted discontinuously at the timing different from the timing of the E-MBMS content in the position 2 different from the E-MBMS service position (position 1 in FIG. 26). As shown in FIG. 26, when the E-MBMS data and the information used for the incoming call processing are transmitted to the mobile terminal at different positions, the mobile terminal must retune from the E-MBMS service position to the position where the information used for the incoming call processing is transmitted. When carrying out the retuning, the mobile terminal executes switching processing from the center frequency F1 (position 1) to F2, and it takes certain time (RT) to obtain stable output of the frequency F2 after the switching. Considering the time lag necessary for the retuning, the information used for the incoming call processing is assigned to the resource blocks in such a manner that it is transmitted after the prescribed time RT necessary for the retuning after the transmission of the E-MBMS content in FIG. 26.

If the system adjusts the timing in such a manner that the PCH transmission time and the E-MBMS service transmission time do not overlap, the mobile terminal that is receiving the E-MBMS service can receive the PCH without any need for the base station, aGW or higher rank apparatus to consider which mobile terminal is receiving the E-MBMS service. In addition, it is also possible to make the foregoing adjustment of the PCH transmission time when transmitting the information used for the incoming call to the mobile terminal that is receiving the E-MBMS, and to transmit the information by placing it on a PCH without being subjected to the timing adjustment when transmitting the information to the mobile terminal that is not receiving the E-MBMS. Such a configuration can increase a degree of freedom because the timing adjustment of the PCH transmission time is not necessary for the mobile terminal that is not receiving the E-MBMS service. However, as for the PCH for the mobile terminal that is receiving the E-MBMS service, the timing adjustment must be made in such a manner that its timing does not overlap with the E-MBMS transmission timing.

Although methods of transmitting the information used for the incoming call processing from the base station to the mobile terminal are described above with reference to FIG. 20-FIG. 26, the methods are applicable not only to the transmission via the PCH but also to the transmission via an SCH (Synchronized Channel). In addition, they are applicable to the case of transmitting an MCCH (Multicast Control Channel) and MTCH (Multicast Traffic Channel) for transmitting control data and user data for the E-MBMS. In this case, the foregoing idea is applicable by replacing the E-MBMS data by the MTCH and the information used for the incoming call processing by the MCCH. Furthermore, in the embodiment 3, although the procedure is described through which the mobile terminal that is receiving the E-MBMS data (including the control information) starts to receive the Unicast data as described above, the idea given in the embodiment 3 is also applicable to the procedure when the mobile terminal that is receiving the Unicast data starts to receive the E-MBMS data (including the control information).

Embodiment 4

As the mobile terminal that is receiving the E-MBMS moves, handover sometimes becomes necessary which switches cells for the communications. When carrying out the handover (hard handover) during receiving the E-MBMS and during transmitting the information used for the incoming call processing via the MCH or MCCH or MTCH rather than PCH, not only the handover source but also the handover target must transmit the information used for the incoming call processing to the mobile terminal. In the LTE communications system, since the base stations are designed to exchange communications with each other, the handover source base station sends information indicating "mobile terminal that performs a handover is receiving E-MBMS service" to a handover target base station. Recognizing that the incoming mobile terminal is receiving the E-MBMS service, the handover target base station transmits a PCH with arranging a schedule in such a manner that the PCH does not overlap with the transmission time of the E-MBMS. Alternatively, it transmits the information used for the incoming call processing to the mobile terminal using an MCH or MCCH or MTCH rather than the PCH. Incidentally, the same processing as described above is executed in the case where the transmission timing of the PCH (of the information used for the incoming call processing) to the mobile terminal that is receiving the E-MBMS service is adjusted in such a manner that it does not overlap with the transmission timing of the E-MBMS data.

Figure 27:
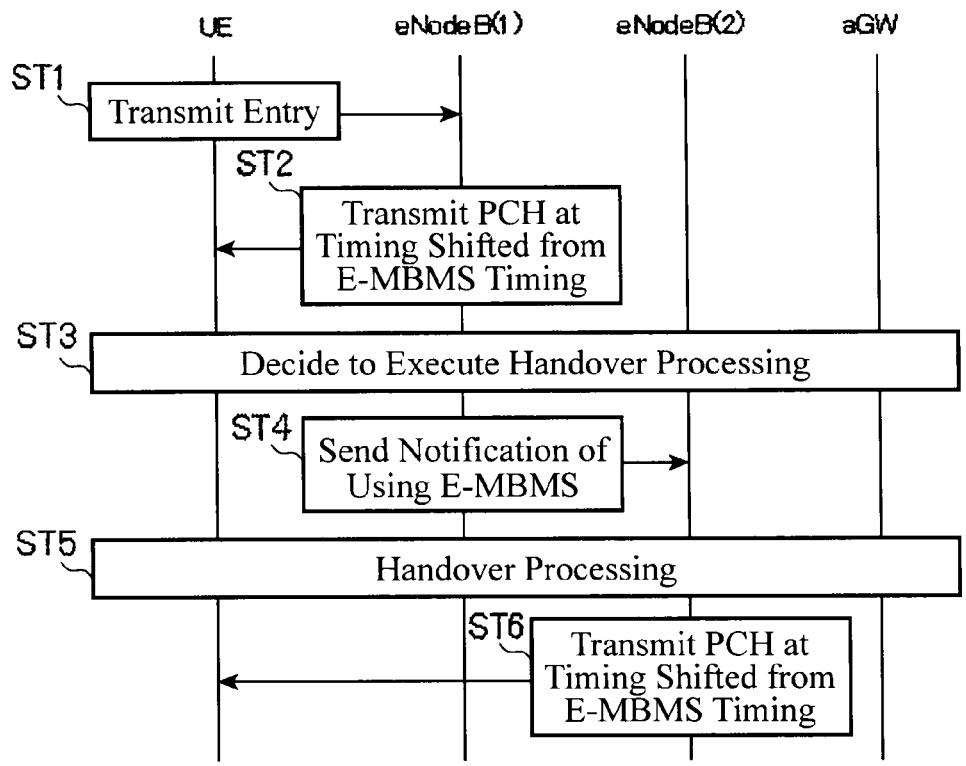
FIG. 27 is a flowchart for showing handover processing for the mobile terminal that is receiving the E-MBMS data.

FIG. 27 is a flowchart showing the handover processing for the mobile terminal that is receiving the E-MBMS data. At step 1, the mobile terminal ready to receive the E-MBMS content sends a notification (Counting or Entry (Subscribe or Activation)) indicating that it is ready to receive desired E-MBMS content to a handover source base station eNodeB (1). Receiving it, the base station transmits the E-MBMS content to the mobile terminal. At step 2, the eNodeB(1) transmits the information used for the incoming call processing via the PCH in such a manner that it does not overlap with the transmission time of the E-MBMS content. At step 3, when it is decided to perform the handover of the mobile terminal from the eNodeB(1) (Source eNodeB), the handover source base station, to an eNodeB(2) (target eNodeB), the handover target base station, the eNodeB(1) sends to the eNodeB(2) information that the "mobile terminal performing the handover is using the E-MBMS service" at step 4. At step 5, when the handover processing has been completed, the eNodeB(2) receiving the notification at step 4 transmits at step 6 the information used for the incoming call processing to the incoming mobile terminal via the PCH in such a manner that it does not overlap with the transmission time of the E-MBMS content.

Incidentally, as for the processing at step 2, either the base station or aGW can execute it, or can carry out in conjunction with the eNodeB. Sending the information necessary for the handover via the communications channel between the base stations has an advantage of being able to transfer in a shorter period of time than the conventional technique (UTRAN system) that sends the notification via a channel passing through the handover source base station—a base station controller (RNC)—the handover target base station. However, the notification can be sent from the handover source base station to the handover target base station via the network. Alternatively, the mobile terminal can send the notification (Counting or Entry (Subscribe or Activation)) of receiving the E-MBMS content again to the handover target base station. This also applies to the case where the information used for the incoming call processing is transmitted via the MCH or MCCH or MTCH rather than the PCH.

Figure 28:
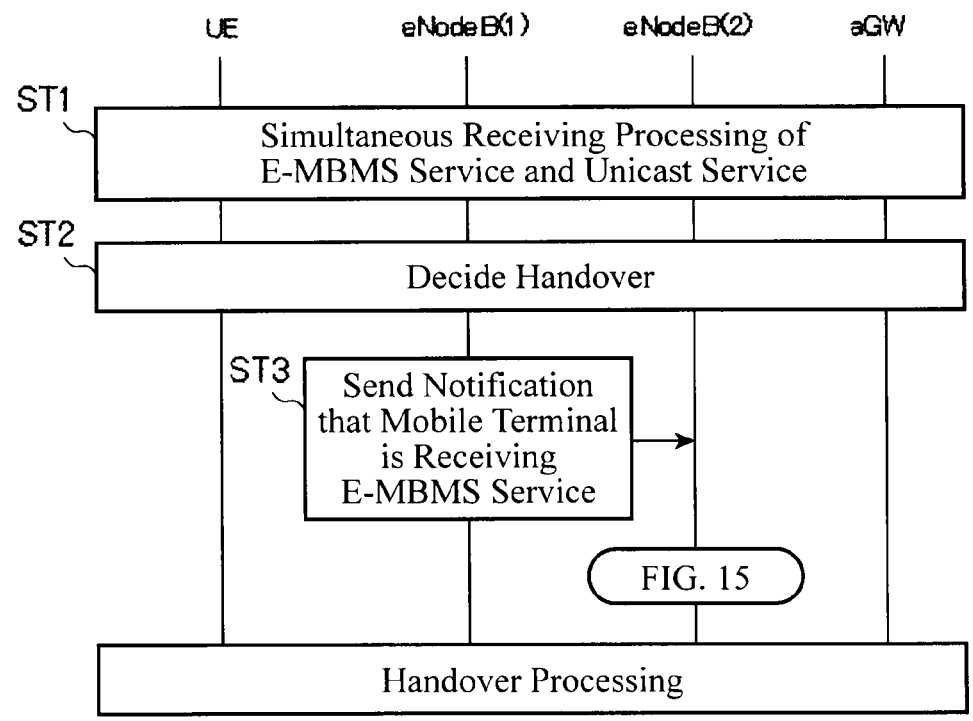
FIG. 28 is a flowchart for showing handover processing for the mobile terminal that is receiving the E-MBMS data.

When the mobile terminal using the E-MBMS service and the Unicast service performs a handover, it is also necessary for the handover target base station to decide on whether to transmit the E-MBMS data and the Unicast data to the mobile terminal. For example, even if the handover source has sufficient radio resources for transmitting both the E-MBMS data and Unicast data, if the handover target has only insufficient radio resources, it sometimes occurs that one of the E-MBMS service and Unicast service must be abandoned. FIG. 28 is a flowchart showing handover processing for the mobile terminal that is receiving the E-MBMS data and the Unicast data. In FIG. 28, when the mobile terminal is using both the E-MBMS service and Unicast service (step 1), and the handover processing is decided (step 2), the handover source base station eNodeB(1) sends the information indicating that the mobile terminal is receiving the E-MBMS data to the handover target base station eNodeB(2). Alternatively, it can send a notification that "the mobile terminal is receiving the E-MBMS service and Unicast service simultaneously". Receiving the notification, the eNodeB(2) makes a decision as to whether it has enough radio resources for providing the mobile terminal with both the E-MBMS service and Unicast service. Since the decision processing was described in detail before with reference to FIG. 15, the description thereof will be omitted here.

Figure 29:
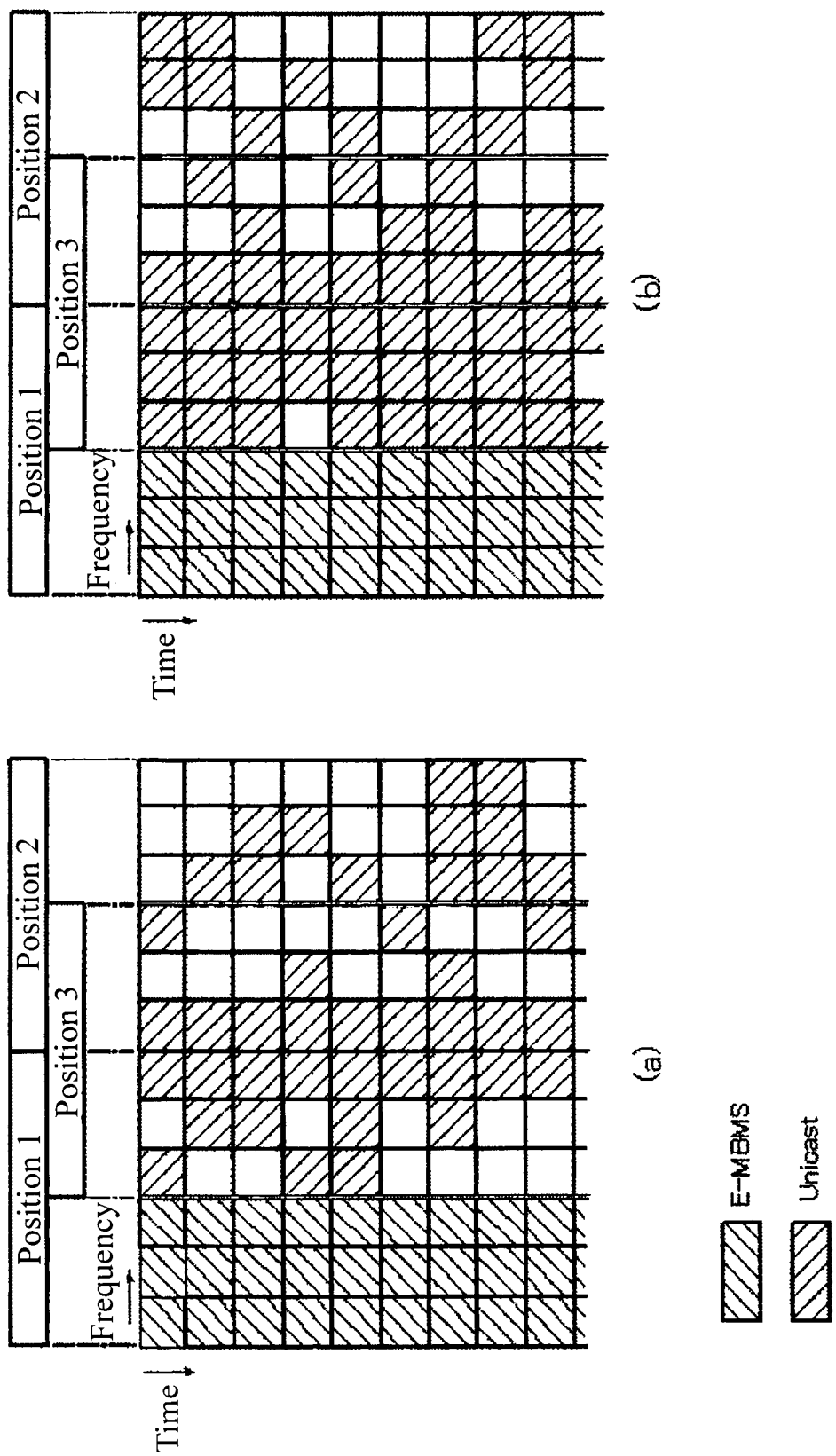
FIG. 29 is a diagram showing resource blocks in a handover source base station, and resource blocks in a handover target base station.

FIG. 29 is a diagram showing resource blocks in the handover source base station and in the handover target base station. FIG. 29(*a*) shows the resource blocks in the handover source base station; and FIG. 29(*b*) shows the resource blocks in the handover target base station. FIG. 29(*a*) shows a case where the processing at step 2 of FIG. 15 makes a decision of approval as to the possibility of utilizing both the E-MBMS and Unicast service simultaneously. Thus, the E-MBMS data and the Unicast data are transmitted to the mobile terminal in the frequency band of the position 1. On the other hand, FIG. 29(*b*) shows a case where the processing makes a decision of refusal as to the possibility of utilizing the E-MBMS and Unicast service simultaneously because of few assignable resource blocks in the frequency band of the position 1. In this case, one of the E-MBMS data and Unicast data to which the user gives priority is transmitted to the mobile terminal.

As described above, when the mobile terminal that is using the E-MBMS service and Unicast service performs a handover, the handover source base station sends before the handover a notification that the mobile terminal is utilizing the E-MBMS service and Unicast service to the handover target base station. Thus, the handover target base station makes a decision whether to transmit the E-MBMS data and Unicast data to the mobile terminal. In this way, making a decision before the handover as to the possibility of utilizing the E-MBMS and Unicast service simultaneously offers an advantage of being able to select a more appropriate cell (a cell capable of utilizing the two services without problem, for example) as the handover target.

What is claimed is:

1. A data communications method executed in a communications system, comprising:

transmitting broadcast data and individual communications data, by a base station that alters a frequency bandwidth over which the broadcast data for providing a point-to-multipoint broadcasting communications service is transmitted and over which the individual communications data for providing a point-to-point individual communications service is transmitted;

receiving at least the broadcast data by a mobile terminal that alters a frequency band over which the broadcast data and the individual communications data transmitted from said base station is received; and performing decision processing of making a decision as to whether said mobile terminal can receive reception-desired content it desires to receive among contents provided by the point-to-multipoint broadcasting communications service, the decision processing being performed in accordance with a frequency bandwidth and a center frequency of said frequency bandwidth, which are both used for transmitting the reception-desired content.

2. The data communications method according to claim 1, wherein the decision processing makes a decision as to whether the reception-desired content can be received in accordance with individual communications presence or absence information indicating whether the content is accompanied by transmission and reception of the individual communications data.

3. The data communications method according to claim 1, wherein when the frequency bandwidth of the base station includes a plurality of frequency bands divided into narrow bands and when the mobile terminal can select a receiving frequency band by switching among the plurality of frequency bands, the decision processing makes a decision as to whether the reception-desired content can be received in accordance with content transmission frequency band information indicating a frequency band assigned for the broadcast data transmission of the content from among the plurality of frequency bands.

4. The data communications method according to claim 1, wherein the mobile terminal executes UE capability information transmission processing that transmits UE capability information including a receivable bandwidth as a parameter to the base station.

5. The data communications method according to claim 4, wherein the UE capability information further includes, as a parameter, individual communications presence or absence information indicating whether the content is accompanied by transmission and reception of the individual communications data.

6. The data communications method according to claim 4, wherein when the frequency bandwidth of the base station includes a plurality of frequency bands divided into narrow bands and when the mobile terminal can select a receiving frequency band by switching among the plurality of frequency bands, the UE capability information includes, as a parameter, selected frequency band information indicating a selected frequency band chosen from the plurality of frequency bands by the mobile terminal.

7. The data communications method according to claim 1, wherein when the frequency bandwidth of the base station includes a plurality of frequency bands divided into narrow bands and when the mobile terminal can select a receiving frequency band by switching among the plurality of frequency bands, incoming call information is transmitted through every one of the plurality of frequency bands to enable the mobile terminal to receive the incoming call information regardless of a selected frequency band indicating a frequency band chosen from the plurality of frequency bands by the mobile terminal, said incoming call information being used for processing of causing individual communications data addressed to a prescribed mobile terminal to reach the mobile terminal.

8. The data communications method according to claim 1, wherein when the frequency bandwidth of the base station includes a plurality of frequency bands divided into narrow bands and when the mobile terminal can select a receiving frequency band by switching among the plurality of frequency bands, incoming call information is transmitted through a same frequency band as a frequency band assigned for the broadcast data transmission of the content from among the plurality of frequency bands, said incoming call information being used for processing of causing individual communications data addressed to a prescribed mobile terminal to reach the mobile terminal.

9. The data communications method according to claim 1, wherein when the frequency bandwidth of the base station includes a plurality of frequency bands divided into narrow bands and when the mobile terminal can select a receiving frequency band by switching among the plurality of frequency bands, incoming call information is transmitted through a shared channel for transmitting content, which is a shared channel used in common by a plurality of mobile terminals and is used for transmitting the broadcast data, said incoming call information being used for processing of causing individual communications data addressed to a prescribed mobile terminal to reach the mobile terminal.

10. The data communications method according to claim 1, wherein when the frequency bandwidth of the base station includes a plurality of frequency bands divided into narrow bands and when the mobile terminal can select a receiving frequency band by switching among the plurality of frequency bands, incoming call information is transmitted through a frequency band different from a frequency band assigned for the broadcast data transmission of the content from among the plurality of frequency bands, and at timing different from transmission timing of the content, said incoming call information being used for processing of causing individual communications data addressed to a prescribed mobile terminal to reach the mobile terminal.

11. The data communications method according to claim 10, wherein said incoming call information undergoes transmission control in a manner that transmission timing of the broadcast data and transmission timing of the incoming call information are shifted by a period of time necessary for switching a selected frequency band chosen from the plurality of frequency bands by the mobile terminal.

12. The data communications method according to claim 7 further comprising:
    making a decision as to whether the broadcast data the mobile terminal is receiving is transmitted discontinuously in an intermittent manner at prescribed time intervals to the mobile terminal; and by making a decision, if the broadcast data is continuously transmitted, as to whether the individual communications data can be transmitted through a same frequency band as a frequency band assigned for the broadcast data transmission.

13. The data communications method according to claim 7 further comprising:
    making a decision as to whether the broadcast data the mobile terminal is receiving is transmitted discontinuously in an intermittent manner at prescribed time intervals to the mobile terminal; and by making a decision, if the broadcast data is discontinuously transmitted, as to whether the individual communications data can be transmitted through a frequency band different from a frequency band assigned for the broadcast data transmission.

14. The data communications method according to claim 7 further comprising:
    communicating, between base stations, information on the mobile terminal that is receiving both the individual communications data and broadcast data.

15. A mobile communications system, comprising:
    a base station that alters a frequency bandwidth over which broadcast data for providing a point-to-multipoint broadcasting communications service is transmitted and over which individual communications data for providing a point-to-point individual communications service is transmitted; and a mobile terminal that alters a frequency band over which the broadcast data transmitted from said base station is received, said mobile terminal making a decision as to whether said mobile terminal can receive reception-desired content it desires to receive among contents provided by the point-to-multipoint broadcasting communications service, the decision being performed in accordance with a frequency bandwidth and a center frequency of said frequency bandwidth, which are both used for transmitting the reception-desired content.

* * * * *